United States Patent
Arrobo Vidal et al.

(10) Patent No.: US 11,659,066 B2
(45) Date of Patent: May 23, 2023

(54) DYNAMIC COMPUTATION IN AN INFORMATION CENTRIC NETWORK

(71) Applicant: Intel Corporation, Santa Clara, CA (US)

(72) Inventors: Gabriel Arrobo Vidal, Hillsboro, OR (US); Srikathyayani Srikanteswara, Portland, OR (US); Daojing Guo, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 17/023,172

(22) Filed: Sep. 16, 2020

(65) Prior Publication Data

US 2020/0412836 A1 Dec. 31, 2020

Related U.S. Application Data

(60) Provisional application No. 62/901,337, filed on Sep. 17, 2019.

(51) Int. Cl.
*G06F 15/173* (2006.01)
*H04L 67/63* (2022.01)
(Continued)

(52) U.S. Cl.
CPC ............ *H04L 67/63* (2022.05); *H04L 45/306* (2013.01); *H04L 45/54* (2013.01); *H04L 67/568* (2022.05)

(58) Field of Classification Search
CPC ..... H04L 67/63; H04L 67/568; H04L 45/306; H04L 45/54; H04L 45/38; H04L 69/22;
(Continued)

(56) References Cited

U.S. PATENT DOCUMENTS

2016/0043940 A1* 2/2016 Mahadevan ............ H04L 63/10
 709/223
2016/0182680 A1* 6/2016 Stapp ...................... H04L 67/63
 709/217
(Continued)

OTHER PUBLICATIONS

"CcndStrategy—NFD—NDN project issue tracking system", [Online]. Retrieved from the Internet: URL: https: redmine.named-data.net projects nfd wiki CcndStrategy, (Apr. 9, 2019), 1 pg.
(Continued)

*Primary Examiner* — Dustin Nguyen
*Assistant Examiner* — Hao H Nguyen
(74) *Attorney, Agent, or Firm* — Schwegman Lundberg & Woessner, P.A.

(57) ABSTRACT

Systems and techniques for dynamic computation in an information centric network (ICN) are described herein. An interest packet to perform a computation may be received at a first interface of an ICN node. The ICN node may then perform a lookup in a forwarding information base (FIB) to identify a second interface to forward the interest packet. The interest packet may be forwarded on the second interface. Upon receipt of a data packet on the second interface in response to the interest packet, the ICN node may update an entry in the FIB for the second interfaces with a processing payload included in the data packet. The ICN node may then transmit the data packet downstream towards the originator of the interest packet.

18 Claims, 16 Drawing Sheets

(51) Int. Cl.
*H04L 45/00* (2022.01)
*H04L 45/302* (2022.01)
*H04L 67/568* (2022.01)

(58) Field of Classification Search
CPC ... H04L 45/22; H04L 45/566; H04L 2101/35; H04L 45/00; H04L 45/20
See application file for complete search history.

(56) References Cited

U.S. PATENT DOCUMENTS

| | | | |
|---|---|---|---|
| 2016/0234333 A1* | 8/2016 | Yeh | H04L 67/568 |
| 2017/0046342 A1* | 2/2017 | Azgin | H04L 45/748 |
| 2017/0230339 A1* | 8/2017 | Xie | G06F 21/64 |
| 2017/0359254 A1* | 12/2017 | Oran | H04L 69/22 |
| 2018/0145908 A1* | 5/2018 | Fox | H04L 45/38 |
| 2018/0242186 A1* | 8/2018 | Muscariello | H04W 72/1252 |
| 2018/0287940 A1* | 10/2018 | Westphal | H04L 67/63 |
| 2019/0158622 A1* | 5/2019 | Balakrishnan | H04L 67/5682 |
| 2019/0199633 A1* | 6/2019 | Azgin | H04L 67/63 |
| 2019/0288874 A1* | 9/2019 | White | H04L 67/563 |
| 2019/0306233 A1* | 10/2019 | Compagno | H04L 67/12 |
| 2020/0314111 A1* | 10/2020 | Fu | G06F 21/445 |
| 2021/0112004 A1* | 4/2021 | Byun | H04L 45/741 |
| 2021/0328783 A1* | 10/2021 | Doshi | H04L 9/0861 |
| 2021/0359871 A1* | 11/2021 | Ding | H04M 15/852 |
| 2022/0158934 A1* | 5/2022 | Himayat | H04L 45/745 |

OTHER PUBLICATIONS

"Named Data Networking Consortium, ContentType—NDN Specifications—NDN project issue tracking system", [Online]. Retrieved from the Internet: URL: https: redmine.named-data.net projects ndntlv wiki ContentType, (accessed on Oct. 22, 2021), 1 pg.

Afanasyev, Alecander, "NFD Developer's Guide", (Aug. 6, 2019), 74 pgs.

Lehman, Vince, "An experimental investigation of hyperbolic routing with a smart forwarding plane in NDN", 2016 IEEE ACM 24th International Symposium on Quality of Service (IWQoS),, (2016), 10 pgs.

Kylomenos, George, "A survey of information-centric networking research", IEEE Communications Surveys and Tutorials 16 2, (2014), 26 pgs.

Zhang, Lixia, "Named Data Networking", ACM SIGCOMM Computer Communication Review vol. 44, No. 3, (Jul. 2014), 66-73.

* cited by examiner

DYNAMIC COMPUTATION IN AN INFORMATION CENTRIC NETWORK

CLAIM OF PRIORITY

This patent application claims the benefit of priority, under 35 U.S.C. § 119, to U.S. Provisional Application Ser. No. 62/901,337, titled "DYNAMIC INFORMATION CENTRIC NETWORK FORWARDING STRATEGY FOR MULTIPLE SOURCE COMPUTATION" and filed on Sep. 17, 2019, the entirety of which is hereby incorporated by reference herein.

TECHNICAL FIELD

Embodiments described herein generally relate to computer networking and more specifically to dynamic computation in an information centric network (ICN).

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As noted above, an ICN is a novel networking architecture that access the content by its name, which is a paradigm shift from the current networking architecture (based on Internet Protocol [IP]) where the communication is host-to-host and content delivery relies on sessions between two end points.

Figure 1:
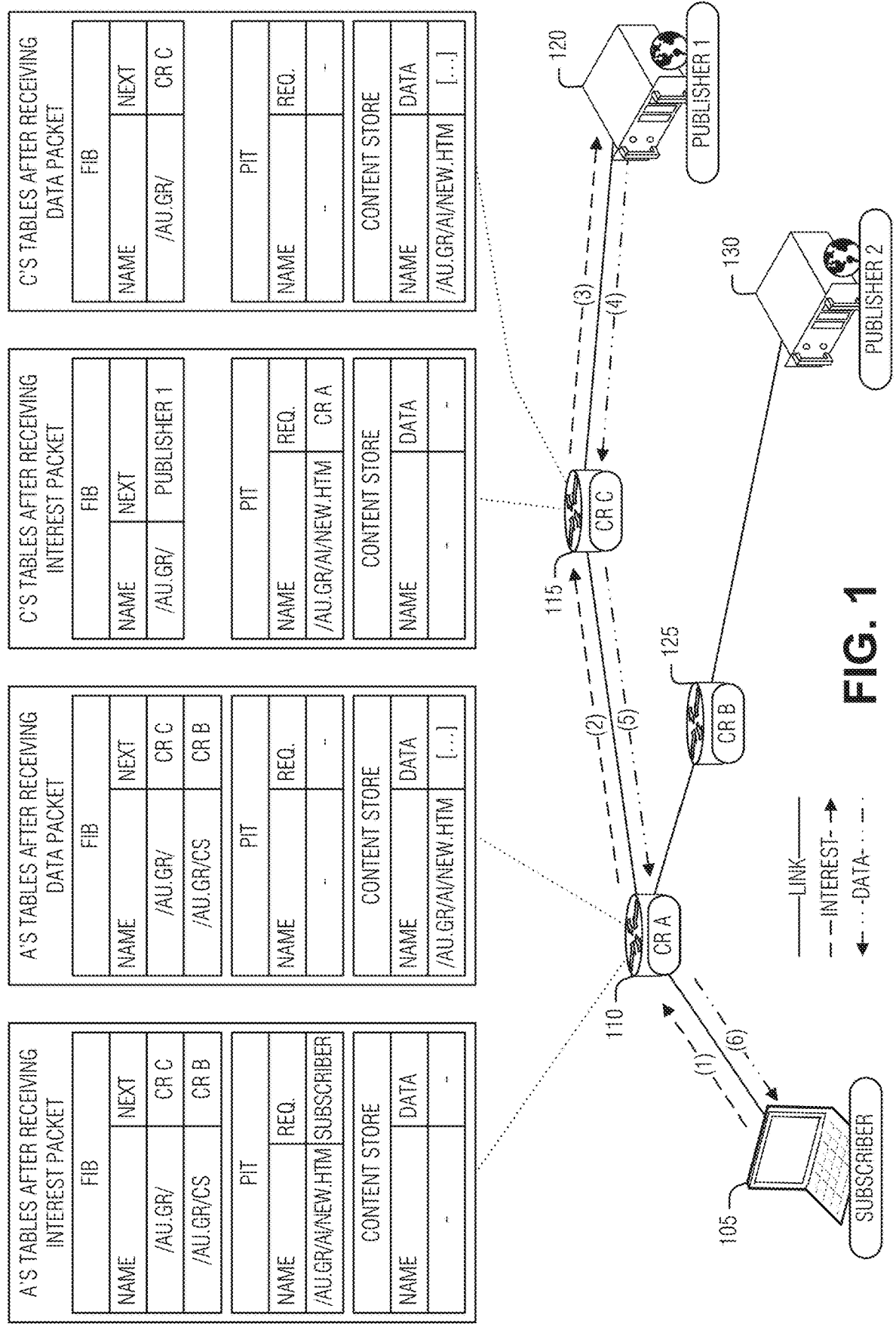
FIG. 1 illustrates request and response for content delivery in an ICN, according to an embodiment.
Figure 10:
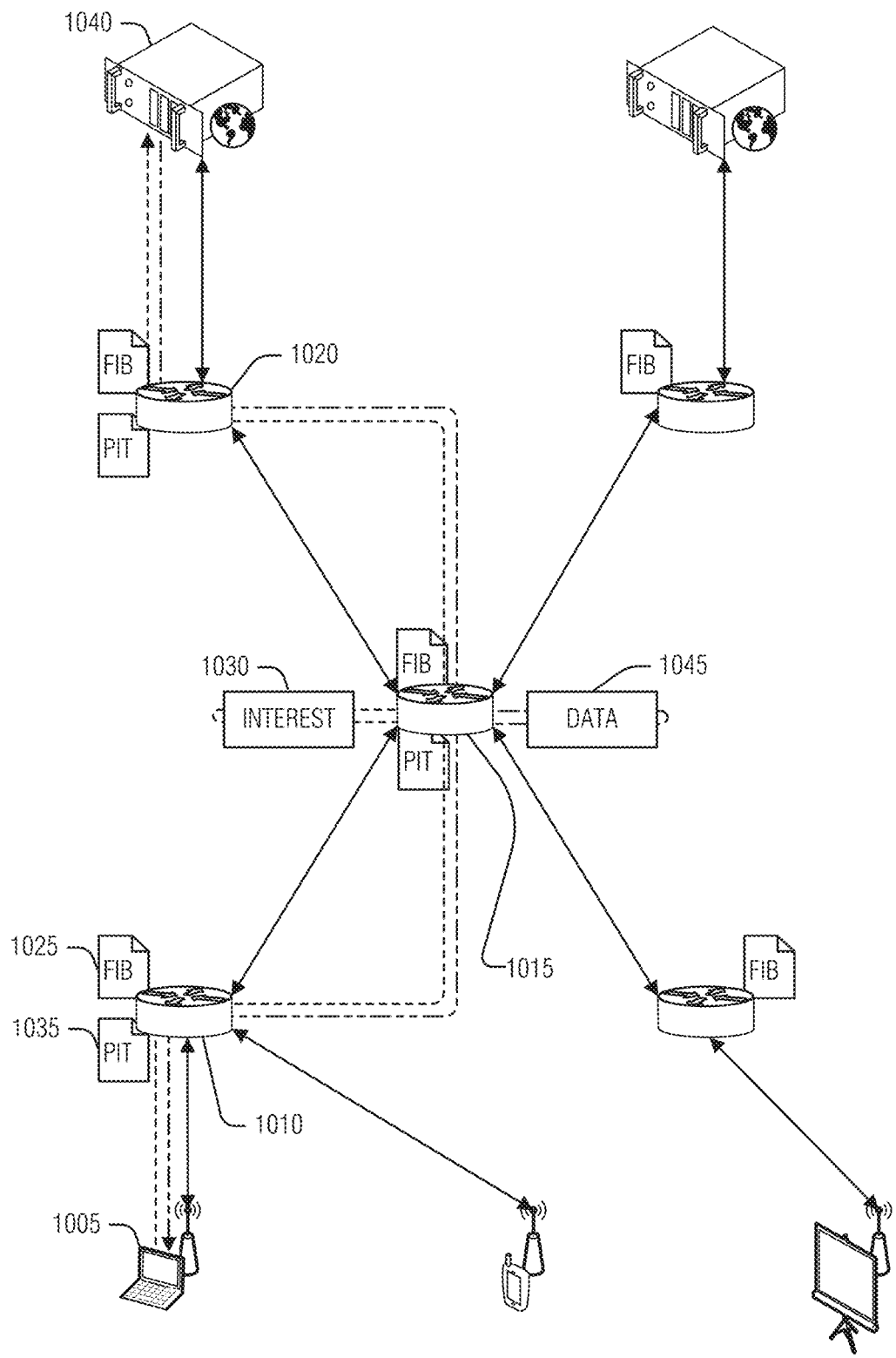
FIG. 10 illustrates an example ICN, according to an embodiment.

In an ICN, access to the content is done through a pull-based model, where a client (e.g., a consumer) sends interest packets to the network requesting for a given content by its name and the network replies (sending data packets) with the content that was requested. FIG. 10 illustrates several ICN concepts. However, a scenario illustrating the interest and data packet flow is presented in FIG. 1. As illustrated in FIG. 1, a subscriber 105 creates an interest packet, specifying a name for content that the subscriber 105 is attempting to obtain. The interest packet (also referred to as the "interest") is transmitted (1) to the content router A 110. The interest is forwarded (2) to the content router c 115 based on the FIB of the content router A 110. Note that, although content router A 110 has a link to content router B 125, which in turn has a link to publisher 2 130, the interest is not forwarded on these links because the FIB of content router A 110 either indicates that the content cannot be found there, or is not the optimal source for the content.

The content router C 115 forwards the interest (3) to the publisher 1 120. The publisher 1 120 responds with a data packet (4) to the content router C 115. The content router C 115 looks up the name from the data packet in the local PIT to determine on which interface to transmit the data packet, here, back (5) to content router A 110. By following the PIT entries, the data packet traverses the network until it is delivered (6) to the subscriber 105. The connections between ICN devices can be wired (e.g., electrical, optical (e.g., fiber optic), etc.) or wireless.

Figure 2:
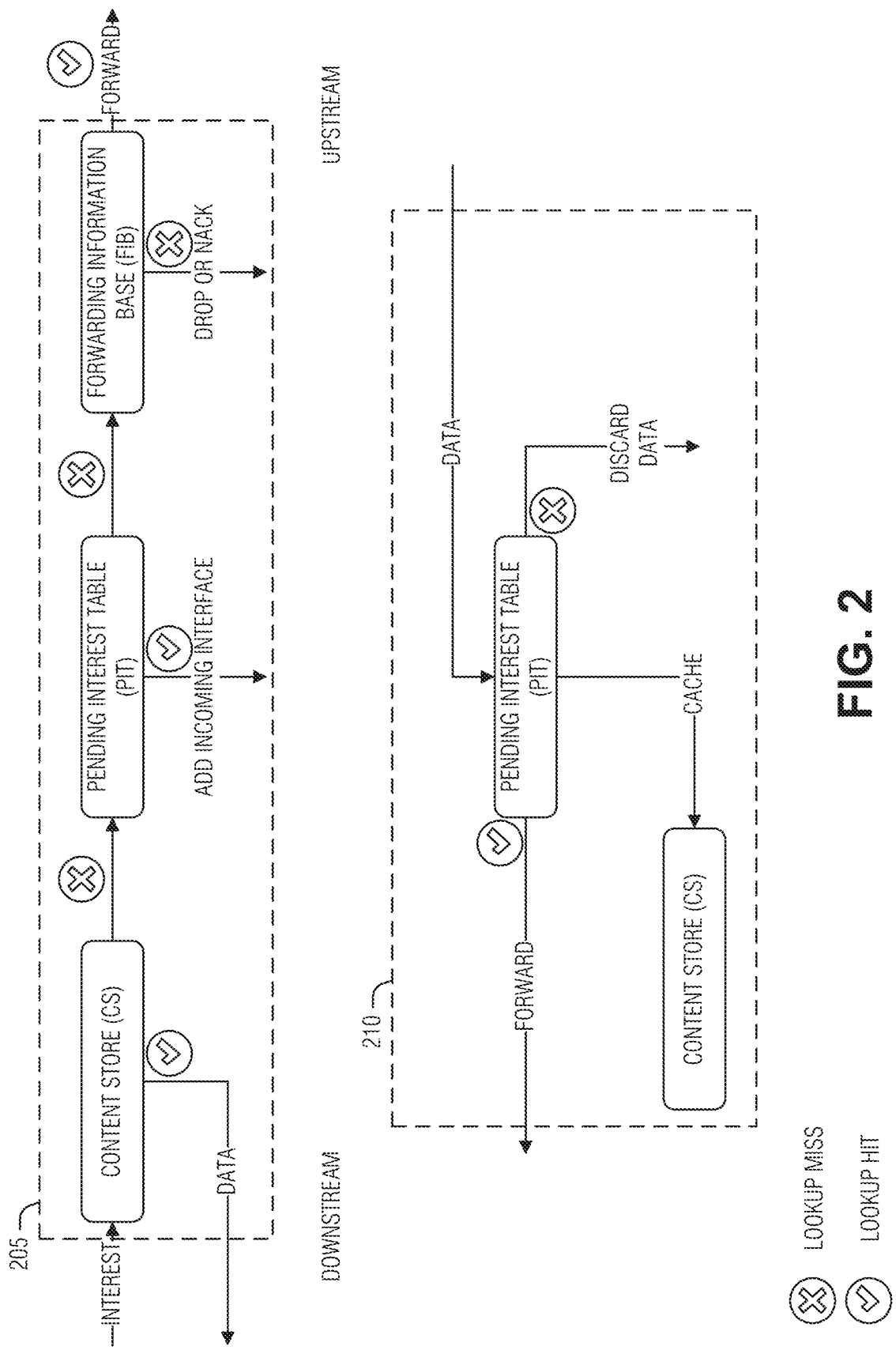
FIG. 2 illustrates an example of process for forwarding packets at an ICN node, according to an embodiment.

FIG. 2 illustrates an example of process for forwarding packets at an ICN node, according to an embodiment. The diagram is split into a forwarding section 205 and a delivery section 210 respectively for forwarding interest packets and delivering data packets in response to interest packets. The process to retrieve data is as follows. When a node receives an ICN interest packet, it checks its Content Store (CS) to see whether it already has the content cached. If not, the interest packet is passed to the Pending Interest Table (PIT) to find a matching name. If no match is found, the node records the interest in its PIT and forwards the interest to the next hop(s) towards the requested content based on the information in its Forwarding Information Base (FIB).

Forwarding strategies may include the following:

Best Route Strategy: This strategy forwards an interest to the upstream with lowest routing cost based on information present at each node.

Multicast Strategy: This strategy forwards every interest to every upstream indicated by the supplied FIB entry that contains the desired prefix.

NCC Strategy: This strategy is a reimplementation of CCNx 0.7.2 default strategy. It has a hierarchical name prefix table that stores both permanent and temporary forwarding states.

Access Router Strategy: This strategy is designed for local site prefix on an access/edge router. It may multicast the first interest to every upstream and when the data comes back, it remembers the upstream for where the data came from. For the subsequent Interests, it uses the last working upstream.

Adaptive SRTT-based Forwarding (ASF) Strategy: This strategy forwards Interests to the upstream with the lowest smoothed round trip time (SRTT) and periodically probes other upstream nodes.

Self-Learning Strategy: This strategy first broadcasts interests to learn a single path towards data, then unicasts subsequent interests along the learned path.

The above forwarding strategies may be used to retrieve static data from a producer (e.g., publisher). However, these strategies may not be optimal when the interest packet is requesting a result of a computation to be executed at the producer or intermediary nodes. ICN has been traditionally used for data. While there have been some suggestions to use ICN for compute, they typically are based on a single compute server. However, practical edge compute that makes use of all available compute will have multiple compute server options. To bring these many possible compute units to bear on a problem, a forwarding strategy that the routers in the network may use to route each compute request to the server best suited to perform the compute. This forwarding strategy may be used for computing in the ICN network. The routers in the network are aware of the compute resources and their loads so they may route a request to the right server.

Computing and intelligence moving to the edge (e.g., closer to device endpoints) is the trend and the vision for the future. The forwarding techniques described herein enable an intelligent network with knowledge of the compute resources and use that information to find the right compute server for each client. Thus, multiple layers of overhead currently needed to implement such systems are removed.

Figure 3:
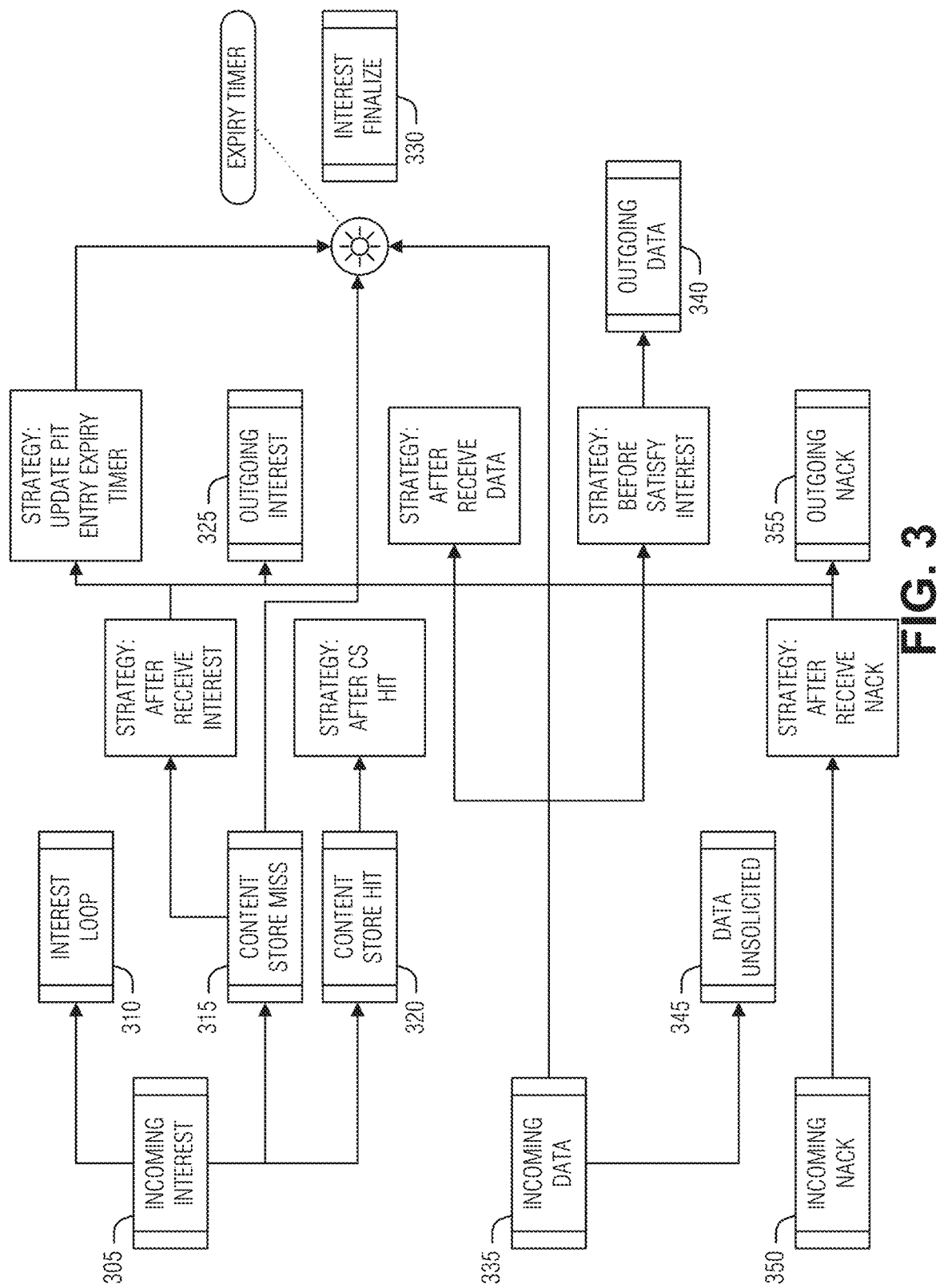
FIG. 3 illustrates an example of a forwarder daemon in an ICN, according to an embodiment.

FIG. 3 illustrates an example of a forwarder daemon in an ICN, according to an embodiment. Generally, the techniques described herein enable dynamic routing of computation interest packets while maintaining backwards compatibility with current ICNs (e.g., NDN realization or implementation)

Given that forwarding strategies may be configured by name and prefix (or the prefix in a name), the prefix "/compute" is used in the following examples, although other prefixes may be used. This strategy may be applied to any prefix/name.

There might be a routing protocol or discovery protocol (e.g., along with a synchronization protocol) that helps the FIB table to know about all the compute nodes that may process or execute computations for a given consumer. If there is no routing or discovery protocol, the intermediary nodes may be using all of their faces to multicast the first received interest packet with the "/compute" prefix.

An example implementation that may be used is a Named Data Networking (NDN) Forwarder Daemon (NFD). FIG. 3 illustrates an example of an NFD workflow. As illustrated, the NFD has forwarding pipelines (numbered elements) and forwarding strategies (marked as "STRATEGY" in FIG. 3). Thus, an incoming interest pipeline 305 determines whether to move an interest packet response to a content store hit pipeline 320 (e.g., the ICN node already has the named content), a content store miss pipeline 315, or an interest loop pipeline 310. The content store hit pipeline 320 implements a CS hit strategy to respond to the interest packet. The content store miss pipeline implements a miss strategy that may result in forwarding the interest (e.g., the outgoing interest pipeline 325) or a negative acknowledgment (NACK) pipeline 355, as well as implement a PIT expiry timer strategy. This strategy may result in finalizing (e.g., terminating the interest) at the interest finalize pipeline 330.

An incoming data packet pipeline 335 may implement strategies for handling internal tables, etc. after data is received, as well as a return strategy that result in sending the data packet back to an author of an interest packet through the outgoing data pipeline 340. If the data is unexpected (e.g., not in a local PIT), then an unsolicited data pipeline 345 may invoked. The incoming NACK pipeline 350 may implement a NACK strategy resulting in sending a NACK through the outgoing NACK pipeline 355.

Through these pipelines and strategies, a dynamic selection of computing resources may be enabled by a forwarding strategy that uses a new ContentType for data packets, a workflow of the proposed forwarding strategy, and by maintaining the status of compute resources at intermediary (e.g., forwarding) nodes.

The new ContentType for the data packets is used to inform intermediary nodes of computing resource availability in computing nodes. For example, a ContentType named "ComputingCapabilities" may be used and the Value number 7 may be assigned to it (although other content type numbers may be used).

The content of the data packet for this new ContentType may be as simple as a binary variable, where '0' indicates that the compute node is available to execute computations (e.g., "available") or '1' indicates that the compute node is not available to execute any computation (e.g., "busy"). In an example, the number may be between 0 and 1 to indicate a fractional load of the compute node (e.g., server). In an example, the content for the ContentType field may be more complex than a binary value. For example, the compute node may use this ContentType along with data in the data packet to signal whether the server is "busy" or "available", an indication of the server's computing capabilities—static or unchanging attributes of the compute node such as such as memory, processing power, or specialized hardware (e.g., decoders, filed programmable gate arrays (FPGAs), etc.) among other things—or dynamic attributes such as currently used or available computing capability or resources. This last element may be useful if, for example, the compute node is busy performing some other computation, to indicate that is "busy" and how long it is already executing a given "computation", etc.

In an example, if producer nodes (e.g., servers, compute nodes, etc.) are the only entities creating data packets for the computation, the resource availability for computing (e.g., "ComputingCapabilities") may be inserted at the application level by each computing node. In an example, an assumption may be made that there is some type of trust relationship between the compute nodes and the router (e.g., intermediary) nodes such that router nodes are able to read the content of the data packets at the network layer or read the content at the application layer and pass this information to the network layer.

Figure 4:
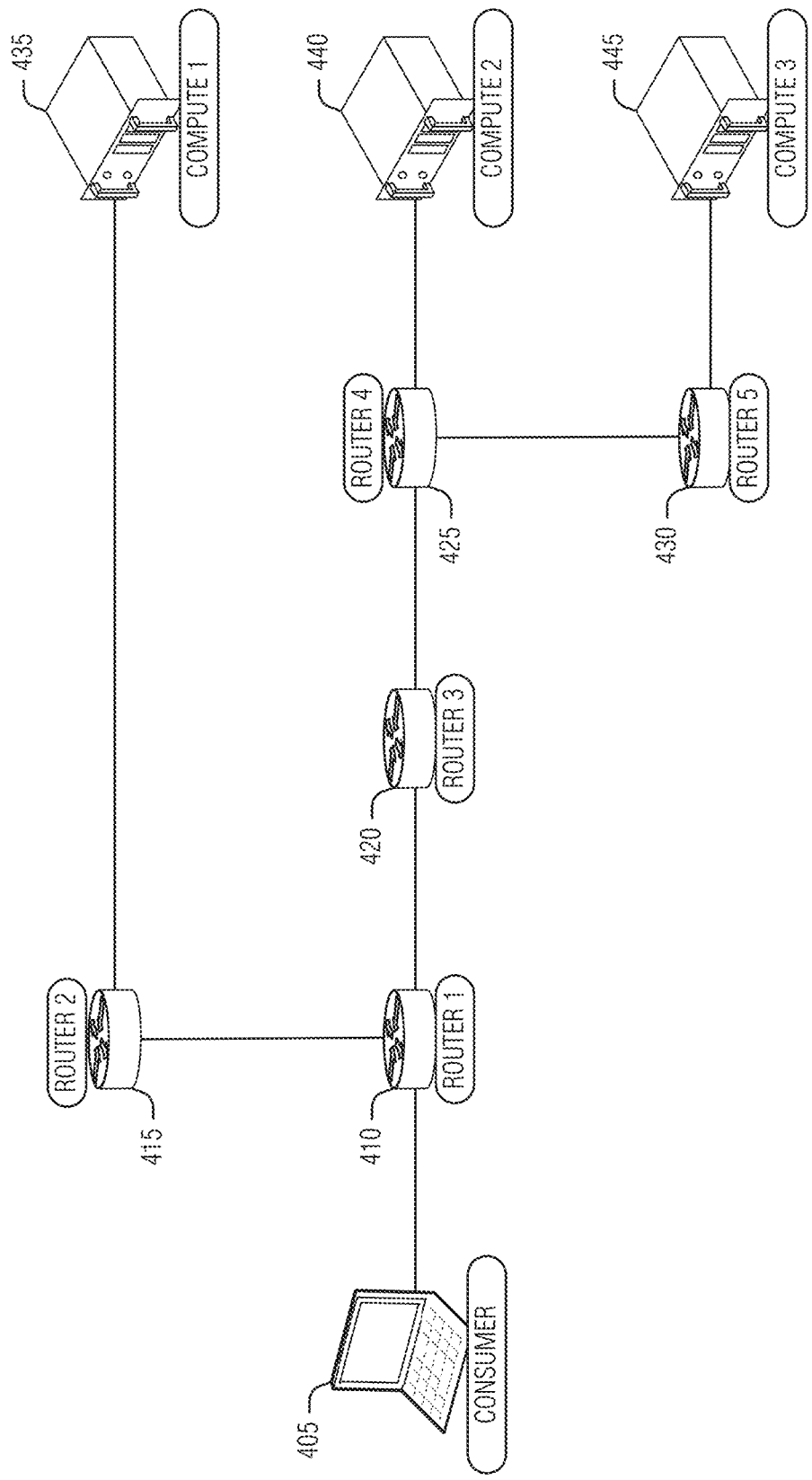
FIG. 4 is an example of an ICN network topology, according to an embodiment.

FIG. 4 is an example of an ICN network topology, according to an embodiment. The network topology shown in FIG. 4 is used below as an example for the described forwarding strategy for the prefix "/compute" which is a signal that a computation is expected to be performed. A workflow through these elements may proceed as follows:

A consumer 405 sends out a first interest packet that requests a given computation (e.g., /compute/xyz). Specific information about the result of the computation (e.g., data and parameters of the function) may be embedded in the ApplicationParameters field of the interest packet.

Router 1 410 receives that interest packet and follows the typical processing as in regular ICN.

Then, in router 1 410, the Strategy: after receive interest will check its FIB table to see what faces should be used to forward the packet. If there is no routing or discovery protocol in place, router 1 410 will use all of its upstream faces to forward the interest packet.

Since router 2 415, router 3 420 and router 5 430 have only one face, they receive the interest packet and forward it upstream.

Router 4 425 is the same as router 1 410 and will forward the interest packet upstream through all available faces if there is no routing protocol or it will use all the available faces that the routing protocol populates in the FIB table.

Compute 1 435, compute 2 440, and compute 3 445 receive the interest packet with the requested computation and, if available, start executing it. The compute node that is executing the computation required by in the interest packet, sends a data packet downstream to let the downstream nodes know that the task is being executed. If any server is busy executing another job, it sends a data packet downstream that indicates that it is not executing the task because it is busy. In an example, the information whether a compute node is executing the task requested in the interest packet or is busy executing another task is embedded in the content of a data packet. Additionally, compute node may insert in the content the prefix/name that the consumer may use later to retrieve the results.

Router 5 430 receives a data packet from compute 3 445. Strategy: before satisfy interest: router 5 430 before satisfies interest, it updates its measurement (e.g., information) table with the measure RTT, compute capability, compute status or other relevant information. In an example, router 5 430 modifies (e.g., update or add) its FIB table to include the prefix/name that may be used later to retrieve the results of the computation and the face where the packet was received from.

Router 4 425 receives a data packet from compute 2 440 and compute 3 445 through router 5 430. From the received data packets, router 4 425 may measure the round-trip-time (RTT) and keep a table with this information. In addition, router 4 425 may also store information about the computing capabilities, whether a compute is busy or available, and other information that compute 2 440 or compute 3 445 indicate in the content of their data packets. Thus, if later another interest packet that begins its name with the "/compute" prefix is received, router 4 425 may only forward the interest packet upstream towards the face that has better performance metrics (e.g., better RTT and available/enough computing capabilities). In an example, based on the content of the packet that is sent downstream, the node or router modifies its FIB table to include the prefix/name that may be used later to retrieve the results of the computation and the face where the packet was received from. After this, router 4 425 forwards downstream the first data packet received.

Router 3 420 receives the data packet from router 4 425 and will measure the RTT and maintain information of the computing capabilities of the compute device that sent the data packet. For the case of router 3 420, it is not relevant to measure the RTT or maintain the computing capability information obtained from the content of the data packet because it only has one upstream face. Thus, when router 3 420 receives in the future an interest packet, it just forwards the interest packet upstream through the only available face.

Router 1 410 receives two data packets: one from compute 1 435 through router 2 415 and one from compute 2 440 or compute 3 445 through router 3 420. From the received data packets, router 1 410 may measure the RTT and keep a table with this information. In addition, it may also store information about the computing capabilities, whether a compute is busy or available, and other information that compute 1 435 and compute 2 440 or compute 3 445 indicate in the content of their data packets. Thus, if later another interest packet that begins its name with the "/compute" prefix is received, router 1 410 will only forward the interest packet upstream towards the face that has better performance metrics (e.g., better RTT and available/enough computing capabilities). In an example, router 1 410 modifies its FIB table to include the prefix/name that may be used to retrieve the results of the computation and the face where the packet was received from. Router 1 410 will forward the first data packet received downstream.

The Consumer receives one data packet that comes from Compute 1, Compute 2 or Compute 3 through router 1 410. Based on the information received in the content of the data packet, the consumer 405 may know whether a compute device is executing the task (e.g., computation) requested in the interest packet. Additionally, it might know how long it will take for the results to be ready for retrieval and measure the RTT (e.g., time the request spent in the network).

The consumer 405 may send a subsequent interest packet using the prefix/name provided in the content of the data packet to retrieve the results of the computation (e.g., /compute/xyz/results). Based on the information provided in the content of the received data packet, the consumer 405 may estimate the time it has to wait before it sends an interest packet to retrieve the results of the computation. In an example, this second data packet has a BLOB (type=0) content type, which means it is a regular (e.g., standard status data and not a computation request) payload.

For the network (e.g., nodes) to dynamically choose where to send the computing requests (e.g., interest packets) based on the available computing resources at different nodes, the nodes may track the performance (e.g., time response, etc.) of the requests forwarded through a given face.

In an example, an additional information store, such as a "compute resources" table, which may be linked or attached to the forwarding strategy or included in a FIB, may be used. In an example, the store includes an RTT, which gives a perspective of the networking component) or "available"/ "busy", which gives the perspective of the computing resources.

Figure 5:
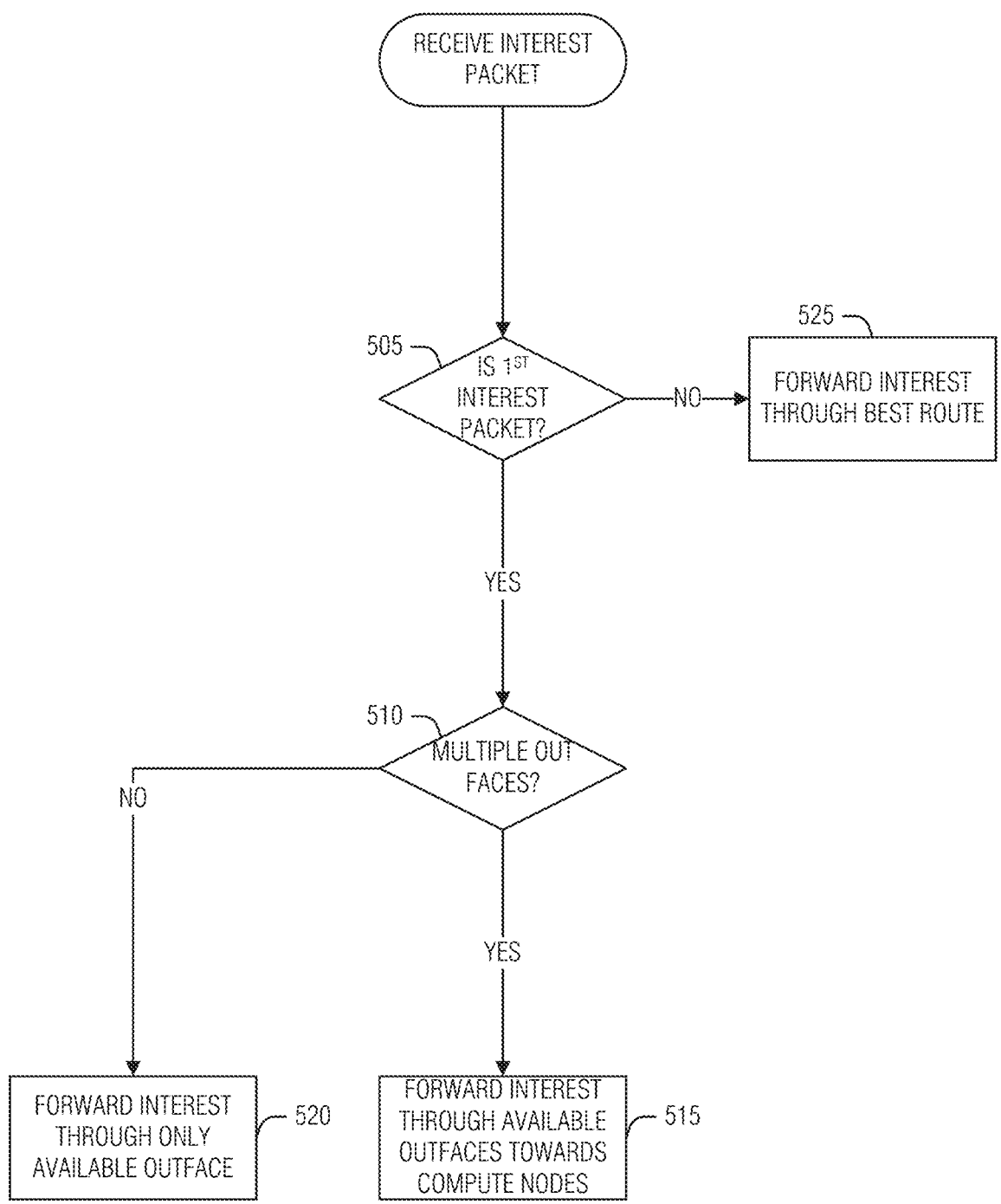
FIG. 5 illustrates an example of an upstream workflow at a router node, according to an embodiment.
Figure 6A:
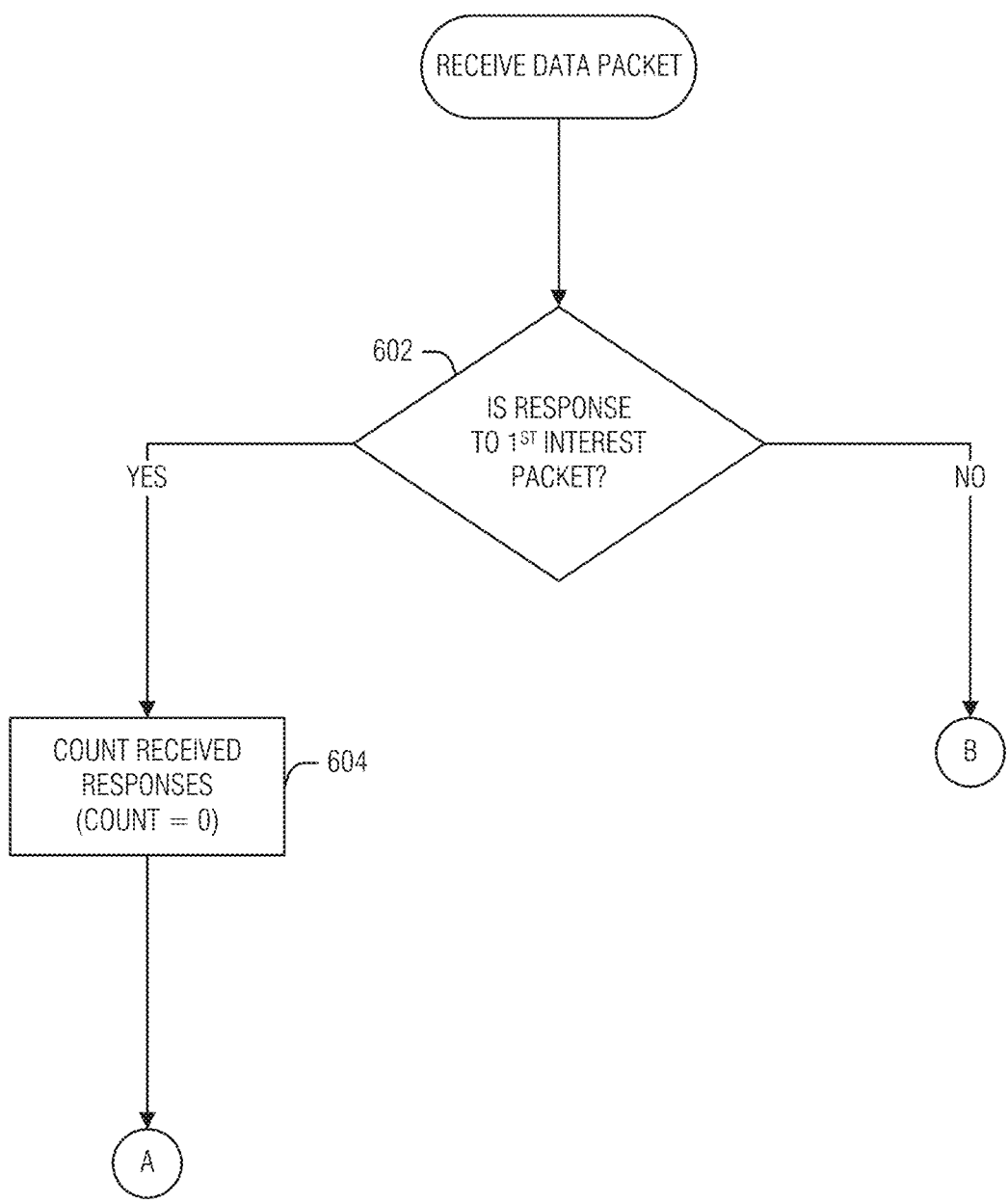
FIGS. 6A-C illustrate an example of a downstream workflow at a router node, according to an embodiment.
Figure 6B:
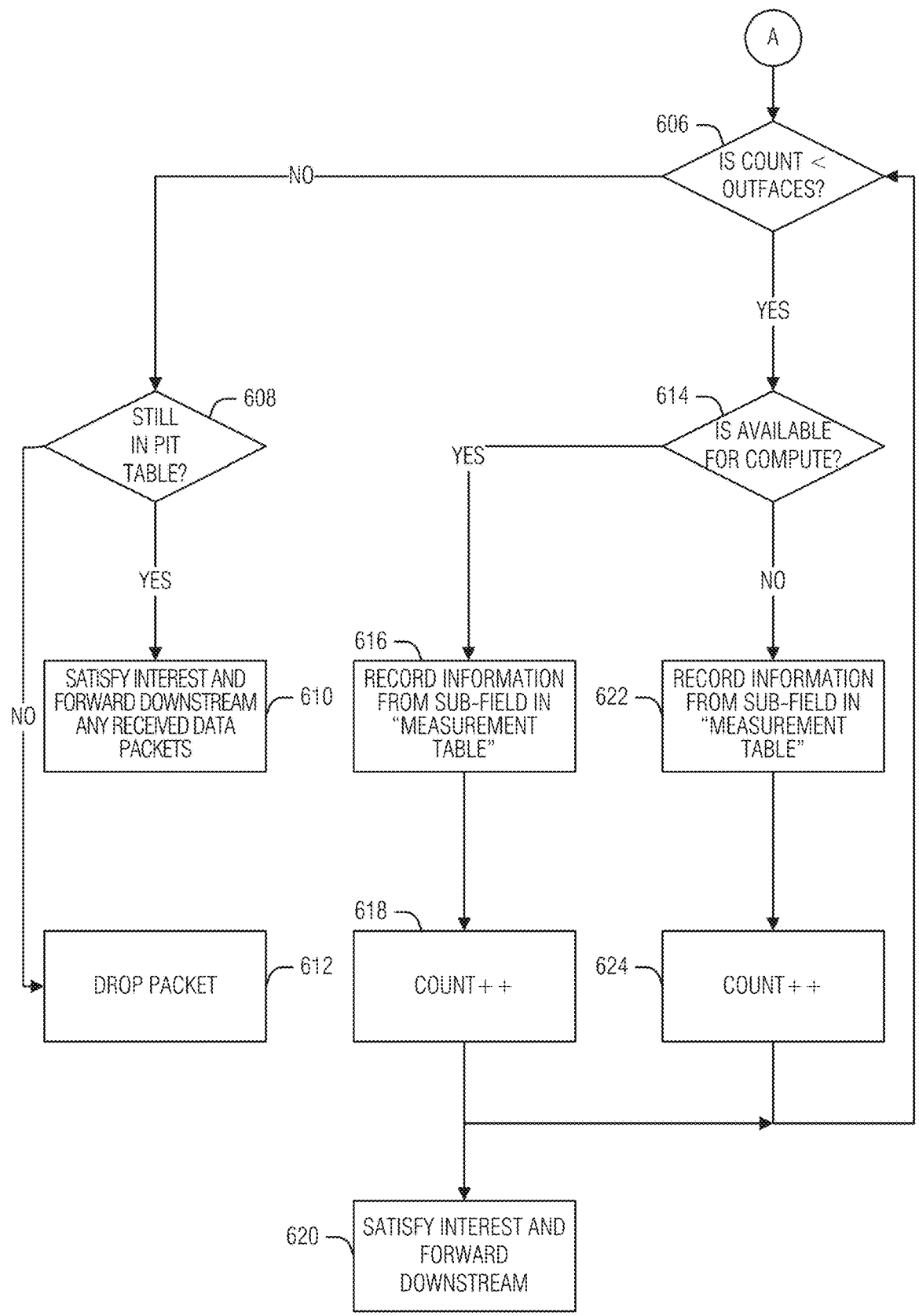
Figure 6C:
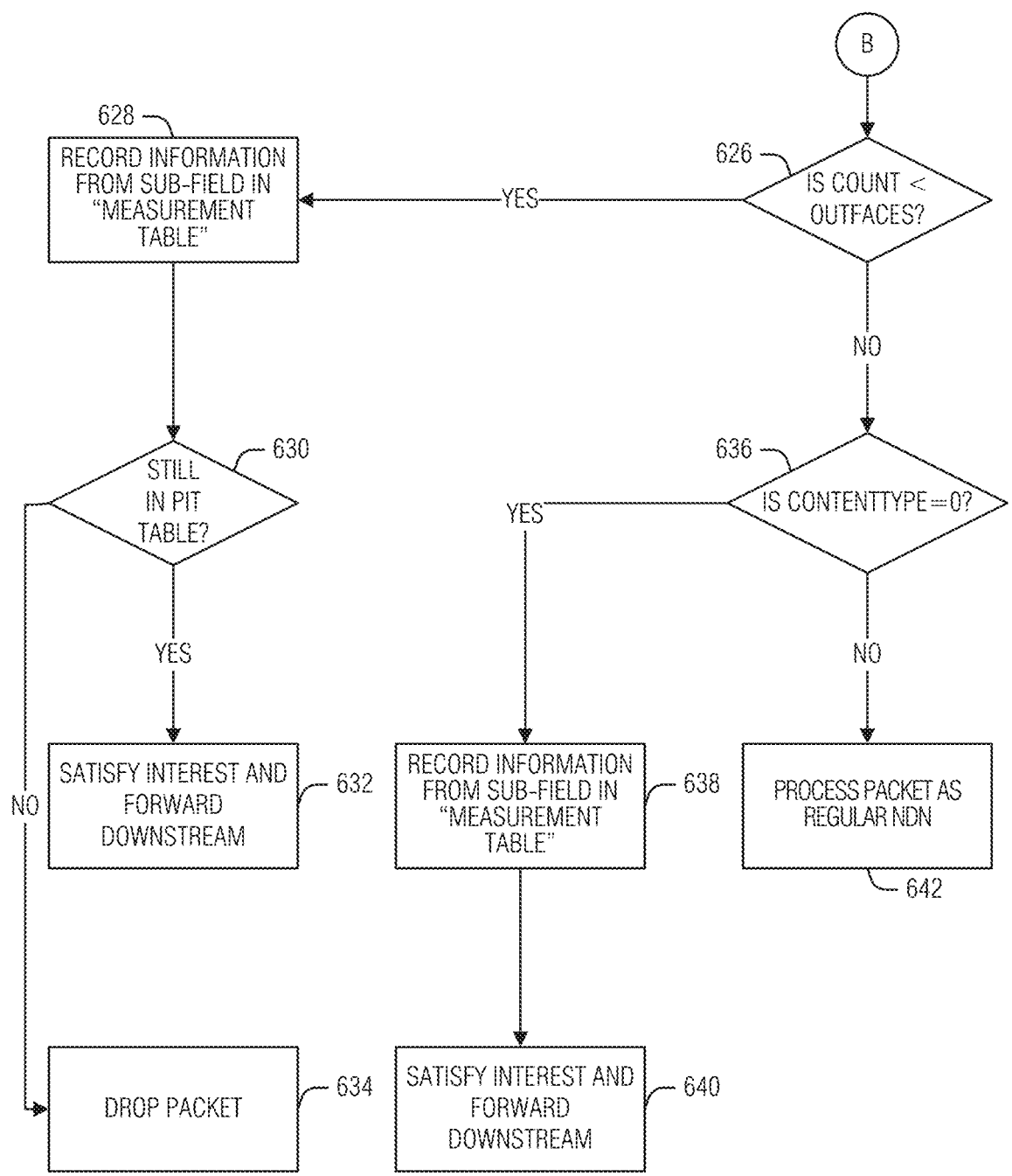
Figure 7:
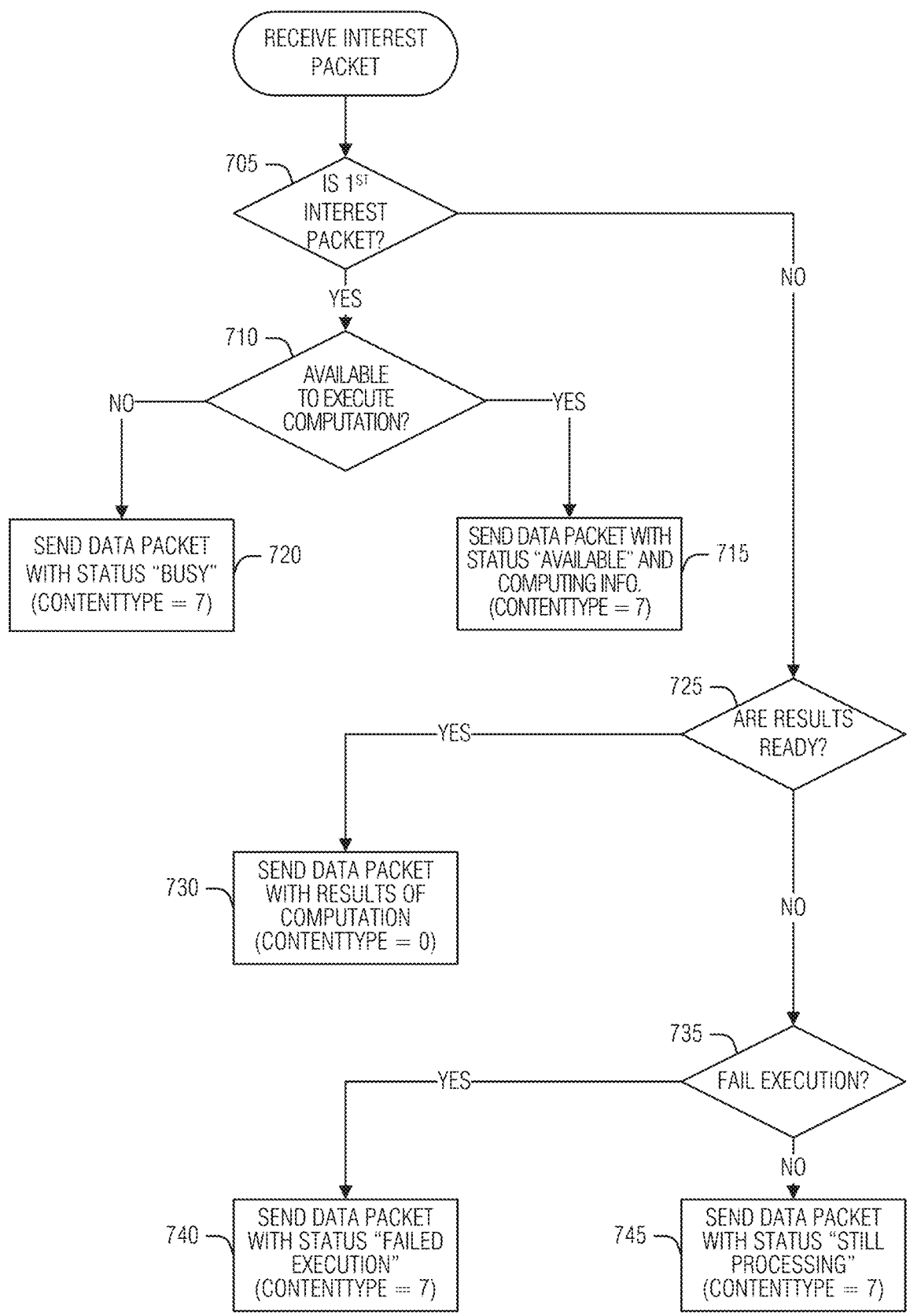
FIG. 7 illustrates an example of a workflow at a compute node, according to an embodiment.
Figure 8:
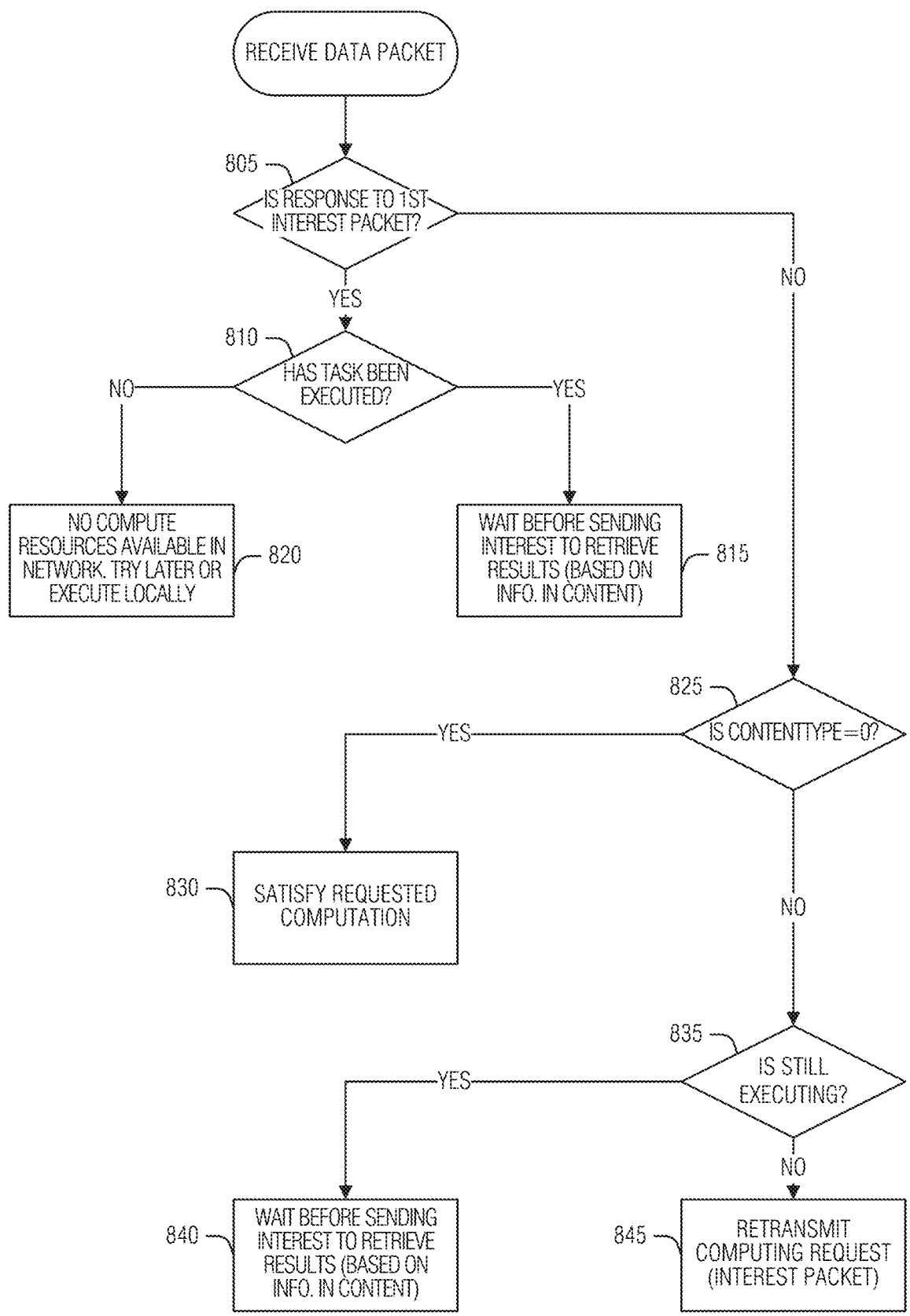
FIG. 8 illustrates an example of a workflow at a consumer node, according to an embodiment.

FIGS. 5-8 illustrate workflows at various actors within an ICN performing dynamic computation. FIG. 5 illustrates an example of an upstream workflow at a router node; FIGS. 6A-6C illustrate an example of a downstream workflow at a router node; FIG. 7 illustrates an example of a workflow at a compute node; and FIG. 8 illustrates an example of a workflow at a consumer node, according to an embodiment.

At FIG. 5 an ICN router receives an interest packet to perform a computation. First, a check (e.g., via the PIT or FIB of the router node) as to whether this is the first interest packet for this computation (decision 505). If not, then the interest is forwarded through the interface with the best route to the computation (e.g., producer) node (operation 525) based on a FIB entry generally.

If this is the first time an interest packet was received for this computation (decision 505), then the router will be forwarded. If the router node has a single interface to reach a compute node (decision 510), then that single interface is used (operation 520), else, all available interfaces will be used (operation 515).

At FIGS. 6A-6C the workflow of the ICN router node receiving a data packet is described. If the received data packet is the first received in response to a first interest packet for a computation (decision 602), then a count of response is reset to zero (operation 604) and a determination (decision 606) is made as to whether the count of responses is less than the number of outbound interfaces (e.g., those interest packet to which the first interest packet was originally forwarded).

If the count of responses is less than the outbound interfaces, then the processing payload is extracted from the data packet and it is determined whether the responding compute node is available to perform computations (decision 614). If yes, then this fact, plus the processing payload information, is recorded (operation 616), the count is incremented by one (operation 618), and the interest is satisfied (e.g., the PIT entry is removed) and sent back to the subscriber (e.g., consumer) node (operation 620).

If the compute node is not available for computations, then this fact, plus the processing payload information, is recorded (operation 622), the count is incremented by one (operation 6624), and the interest is satisfied (e.g., the PIT entry is removed) and sent back to the subscriber (e.g., consumer) node (operation 620).

If, however, after decision 606, then count of responses is equal to or greater than the number of outbound interfaces (e.g., outfaces), then the router node checks whether there is still a PIT entry for the interest packet (decision 608). If yes, then the interest is satisfied and sent to the subscriber node (operation 610). Else, the data packet is dropped (operation 612).

When the received data packet is not the first response to the first interest packet of a computation (decision 602), then the router node determines whether there have been fewer data packets in response to the first interest packet than interfaces to compute nodes (decision 626). If not, then the data packet is inspected to determine whether its content type is providing results of the computation (e.g., ContentType=), status information about the computation or compute node (e.g., ContentType=7), or whether the data packet holds named data (decision 636). If yes, then the processing payload information, is recorded (operation 638), then the count is incremented by one, and the interest is satisfied (e.g., the PIT entry is removed) and sent back to the subscriber (e.g., consumer) node (operation 640). If no, then the data packet is treated as a standard ICN (e.g., NDN) data packet (operation 642) which may include caching the contents and sending it back to the subscriber in accordance with the PIT entry.

When the response meets or exceeds the outbound interfaces (decision 626), the processing payload of the data packet is recorded (e.g., in the FIB or another measurement table or data structure) (operation 628). A determination is made as to whether the interest still has an entry in the PIT (decision 630). If yes, then the interest is satisfied and sent on to the subscriber (operation 632). If no, then the data packet is dropped (operation 634).

At FIG. 7, the compute node receives an interest packet for a computation. The compute node determines whether it is the first interest packet for this computation (decision 705). If yes, then the compute node determines whether it is able to perform the computation (decision 710). If yes, then a status data packet (e.g., ContentType=7) is sent indicating that the compute node is available along with other metrics of a processing payload (operation 715). If no, then a status data packet is sent indicating that the compute node is not available along with other metrics of a processing payload (operation 720).

When the interest is not the first interest packet (decision 705), the compute node checks whether the results of the computation are complete (decision 725). If yes, then a data packet with a standard data result (e.g., ContentType=0) is sent in response (operation 730). If not, the compute node determines whether the execution failed (decision 735). If yes, a status data packet is sent that indicates the failure along with, for example, an error status message, debugging information, etc. (operation 740). Otherwise, a status data packet is sent to indicate that the computation is still running (operation 745).

At FIG. 8, a subscriber node receives a data packet in response to an interest packet sent to perform a computation. The subscriber determines whether it is the first data packet sent in response (decision 805). If yes, the data packet is read to determine whether the computation has been, or is being, executed (decision 810). If not, then the subscriber may try again later (operation 820). If yes, then the subscriber node will transmit a second interest to retrieve the results (operation 815).

If the data packet is not the first in response to the original interest sent by the subscriber node to perform the computation (decision 805), then the subscriber determines whether the data packet is a data packet that could include the result (e.g., ContentType=0) or a status data packet (e.g., ContentType=7). If it is a result data packet, the result is retrieved and the computation is satisfied (operation 830). Else, the subscriber node determines whether the computation is still executing (decision 835). If yes, the subscriber node will delay before sending another interest packet to retrieve the computation results (operation 840). If no, then the subscriber node may transmit a new interest packet to execute the computation (operation 845) and begin the process again.

Figure 9:
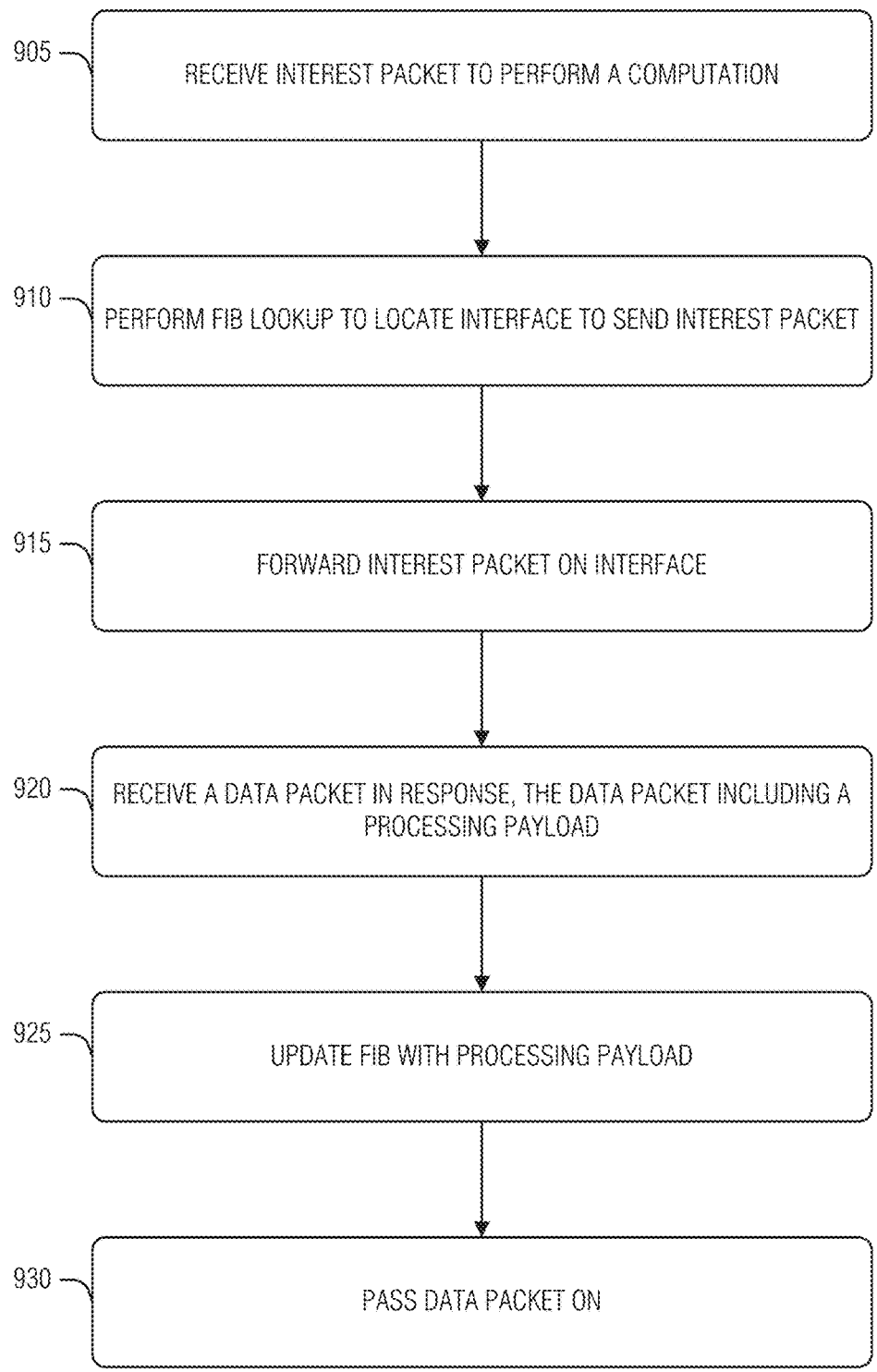
FIG. 9 illustrates an example of a method for dynamic computation in an information centric network (ICN), according to an embodiment.

FIG. 9 illustrates an example of a method 900 for dynamic computation in an ICN, according to an embodiment. The operations of the method 900 are performed by hardware of a network device (e.g., a router, gateway, etc.) supporting the ICN. Such hardware may include processors, memory, or other processing circuitry, such as that described herein (e.g., processing circuitry of FIG. 11).

At operation 905, receiving, at a first interface of an ICN node, and interest packet to perform a computation. Here, the first interface is the interface upon which the subscriber interests are received, and responsive data packets are sent to the subscriber. This interface may also be referred to as a downstream interface with respect to this subscriber. The interest packet includes an indication that it is for a computation, such as a name prefix (e.g., "/computation/ . . . "), a flag, etc. The interest packet may include other data, such as an accuracy for the computation, parameters or ICN names of parameters-which may be used by a compute node to retrieve the parameters), etc. to facilitate the computation.

At operation 910, a lookup in a FIB is performed to identify a second interface to forward the interest packet. Here, the FIB of the node is consulted to determine the best interface upon which to forward the interest in order to reach a compute node (e.g., producer) that may perform the computation. The second interface may be referred to as the upstream or outbound interface in this interaction.

As noted herein, the FIB may hold a data structure, or maintain within FIB entries, compute node capabilities.

These capabilities, which may indicate static metrics of the compute node—such as memory or storage capacity, compute capabilities, etc.—and dynamic metrics of the compute node—such as currently running processes, availability, etc.—are used by the routing node to sort upstream interfaces to select the second interface among several. In an example, the second interface is selected because there is no better upstream interface based on the compute node metric sorting.

At operation 915, the interest packet is forwarded on the second interface. Here, an entry in the PIT is created for the interest packet.

At operation 920, a data packet is received on the second interface in response to the interest packet. Thus, this data packet is a first response to the original interest packet to perform the computation. Here, the data packet includes a processing payload. The processing payload may include the immediate status of the computation request embodied in the original interest packet. Thus, in an example, the processing payload includes a status of a process running in response to the interest packet.

The processing payload also corresponds to the compute node metrics described above. In an example, the processing payload indicates dynamic capabilities of a compute node that provided the data packet. In an example, the dynamic capabilities include an indication that the compute node is performing the process. In an example, the processing payload includes a parameter to include in a future interest packet to receive a result of the process. In an example, the parameter is a name prefix. These examples provide a technique by which a following interest packet specifically asks for the result to the computation by including the prefix provided by the compute node. In an example, the dynamic capabilities include an indication of resource availability, currently running processes, current workload, etc. of the compute node.

In an example, the processing payload indicates static capabilities of a compute node that provided the data packet. Static capabilities include those features of the compute node that do not change over time. For example, the static capabilities may include a set of specialized hardware (e.g., decoders, coprocessors, etc.), processing capacity (e.g., operations-per-second, transactions-per-second, etc.), storage capacity, etc.

At operation 925, an entry for the second interface is updated in the FIB with the processing payload. In this way, the FIB is updated with the upstream routes to indicate the processing capabilities of compute nodes at the various interfaces for the routing node. In an example, the parameter is included in the entry for the second interface in the FIB. Here, the name prefix, for example, is included in the FIB to facilitate a following interest packet from the subscriber to retrieve the results of the computation. Thus, in an example, the method 900 includes receiving a second interest packet that includes the parameter, performing a second lookup of the FIB using the parameter to locate the second interface, and forwarding the second interest packet on the second interface in response to the second lookup. Here, the subscriber received the original data packet with the result parameter and used that parameter to send the second interest packet to retrieve the results. Because the parameter was stored in the FIB, the routing node may quickly find the upstream interface to the compute node and send the second interest on to that compute node.

In an example, the process (e.g., computation) is complete a data packet is received on the second interface in response to the second interest packet (e.g., for the results). Here, the data packet has a content type (e.g., ContentType=0) indicating that it is data in response to the second interest packet. Here, the content type acts like an average ICN request that includes named data. Thus, the results may be cached and forwarded like non-computation requests.

In an example, when the process has failed, the data packet received in response to the second interest packet has a content type (e.g., ContentType=7) indicating that it includes a process response (e.g., status update). In this case, the data in the data packet indicates that the process failed. The data may also include details about the failure, such as an error trace.

In an example, when the process is ongoing, the data packet in response to the second interest packet has a content type (e.g., ContentType=7) indicating that it includes a process response (e.g., status update). Here, the data in the data packet indicates that the process is still running. In an example, the data may include details of the running process, such as elapsed time, expected completion time, etc.

At operation 930, the data packet is transmitted on the first interface in accordance with the PIT. In an example, the entry in the PIT is removed when the data packet is transmitted on the first interface. Thus, the compute node capabilities are transmitted downstream through the ICN network (including routing nodes and subscribers) dynamically in response to the computation interest packets transmitted by subscribers.

FIG. 10 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast. ICN does not include a request for a particular machine and does not use addresses. Instead, to get content, a device 1005 (e.g., subscriber) requests named content from the network itself. The content request may be called an interest and transmitted via an interest packet 1030. As the interest packet traverses network devices (e.g., network elements, routers, switches, hubs, etc.)—such as network elements 1010, 1015, and 1020—a record of the interest is kept, for example, in a pending interest table (PIT) at each network element. Thus, network element 1010 maintains an entry in its PIT 1035 for the interest packet 1030, network element 1015 maintains the entry in its PIT, and network element 1020 maintains the entry in its PIT.

When a device, such as publisher 1040, that has content matching the name in the interest packet 1030 is encountered, that device 1040 may send a data packet 1045 in response to the interest packet 1030. Typically, the data packet 1045 is tracked back through the network to the source (e.g., device 1005) by following the traces of the interest packet 1030 left in the network element PITs. Thus, the PIT 1035 at each network element establishes a trail back to the subscriber 1005 for the data packet 1045 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 1030 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 1030 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 1030 to data cached in the ICN element. Thus, for example, if the data 1045 named in the interest 1030 is cached in network element 1015, then the network element 1015 will return the data 1045 to the subscriber 1005 via the network element 1010. However, if the data 1045 is not cached at network element 1015, the network element 1015 routes the interest 1030 on (e.g., to network element 1020). To facilitate routing, the network elements may use a forwarding information base 1025 (FIB) to match named data to an interface (e.g., physical port) for the route. Thus, the FIB 1025 operates much like a routing table on a traditional network device.

In an example, additional meta-data may be attached to the interest packet 1030, the cached data, or the route (e.g., in the FIB 1025), to provide an additional level of matching. For example, the data name may be specified as "www.somedomain.com or videos or v8675309," but also include a version number—or timestamp, time range, endorsement, etc. In this example, the interest packet 1030 may specify the desired name, the version number, or the version range. The matching may then locate routes or cached data matching the name and perform the additional comparison of meta-data or the like to arrive at an ultimate decision as to whether data or a route matches the interest packet 1030 for respectively responding to the interest packet 1030 with the data packet 1045 or forwarding the interest packet 1030.

ICN has advantages over host-based networking because the data segments are individually named. This enables aggressive caching throughout the network as a network element may provide a data packet 1030 in response to an interest 1030 as easily as an original author 1040. Accordingly, it is less likely that the same segment of the network will transmit duplicates of the same data requested by different devices.

Fine grained encryption is another feature of many ICN networks. A typical data packet 1045 includes a name for the data that matches the name in the interest packet 1030. Further, the data packet 1045 includes the requested data and may include additional information to filter similarly named data (e.g., by creation time, expiration time, version, etc.). To address malicious entities providing false information under the same name, the data packet 1045 may also encrypt its contents with a publisher key or provide a cryptographic hash of the data and the name. Thus, knowing the key (e.g., from a certificate of an expected publisher 1040) enables the recipient to ascertain whether the data is from that publisher 1040. This technique also facilitates the aggressive caching of the data packets 1045 throughout the network because each data packet 1045 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 11:
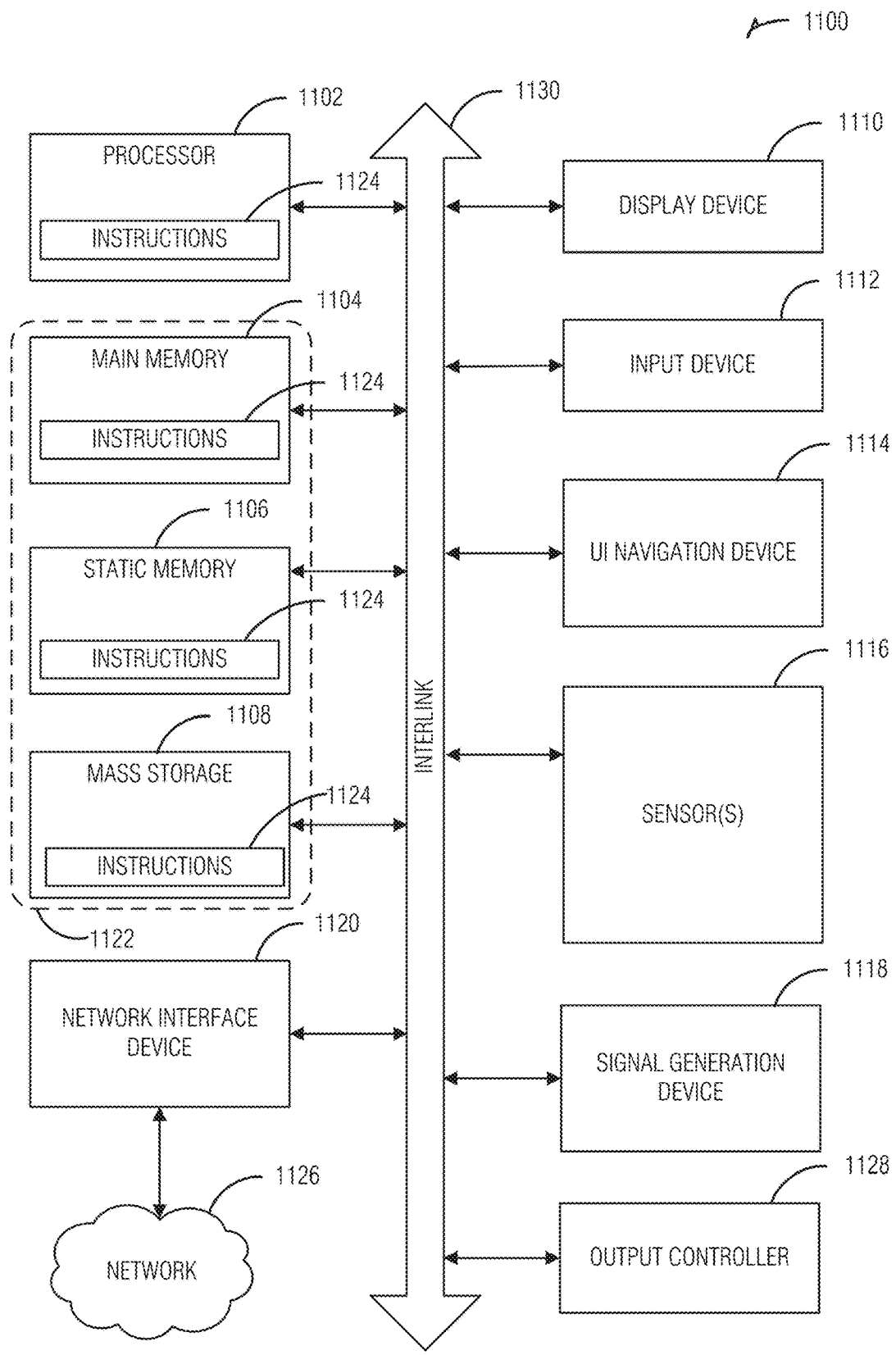
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may perform. Examples, as described herein, may include, or may operate by, logic or several components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1100 follow.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, edge computing, software as a service (SaaS), other computer cluster configurations.

The machine (e.g., computer system) 1100 may include a hardware processor 1102 (e.g., a central processing unit (CPU), a graphics processing unit (GPU), a hardware processor core, or any combination thereof), a main memory 1104, a static memory (e.g., memory or storage for firmware, microcode, a basic-input-output (BIOS), unified extensible firmware interface (UEFI), etc.) 1106, and mass storage 1108 (e.g., hard drive, tape drive, flash storage, or other block devices) some or all of which may communicate with each other via an interlink (e.g., bus) 1130. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1102, the main memory 1104, the static memory 1106, or the mass storage 1108 may be, or include, a machine readable medium 1122 on which is stored one or more sets of data structures or instructions 1124 (e.g., software) embodying or utilized by any one or more of the techniques or functions described herein. The instructions 1124 may also reside, completely or at least partially, within any of registers of the processor 1102, the main memory 1104, the static memory 1106, or the mass storage 1108 during execution thereof by the machine 1100. In an example, one or any combination of the hardware processor 1102, the main memory 1104, the static memory 1106, or the mass storage 1108 may constitute the machine readable media 1122. While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is an example of a machine readable medium.

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

In an example, a machine-readable medium is, as opposed to a transitory propagating signal, one or more articles of manufacture—such as a device (e.g., circuit), material (e.g., a substrate), or combination of the two—that stores instructions for a machine (e.g., computer). These articles may be:

located within the same housing, such as platters in a magnetic hard drive; in the same computer, such as in a magnetic hard drive and a solid-state flash drive in the same computer; or on different computers, such as various storage servers in a cloud. While the instructions embody directives for the machine, the instructions may take on variety of forms between storage and execution. For example, in an interpreted language, it is common that instructions take the form of source code on the machine readable medium but are transformed, by an interpreter, into object code or assembly prior to execution on target hardware, such as execution units in a processor. If the target hardware implements microcode, then even the assembly may be further transformed. In all cases however, the directive persists even though the form of the instruction may change. Examples of form changes for the instructions may include compilation, interpretation, linking, decoding, encoding, packaging, compression, or encryption.

An example of end-to-end instruction transformation in a storage-to-execution scenario may include instructions in the form of source code, modified source code (e.g., obfuscated, compressed, encrypted, transpiled, etc.), and object code placed in files or packages in a machine readable medium spread across a variety of storage locations, such as different storage devices in several data centers. A machine, such as a mobile phone, obtains (e.g., retrieves or receives) the instructions over an interface (e.g., a cellular network), which may be compressed or encrypted in transit, whereupon the files or packages may be decrypted, uncompressed, unpacked, combined, and modified prior to execution. Examples of instruction modification may include compilation of source code, interpretation of interpreted code, linking or assembly of object code, etc. Once the modification, if any, is complete, the instructions are executed on the machine.

Figure 12:
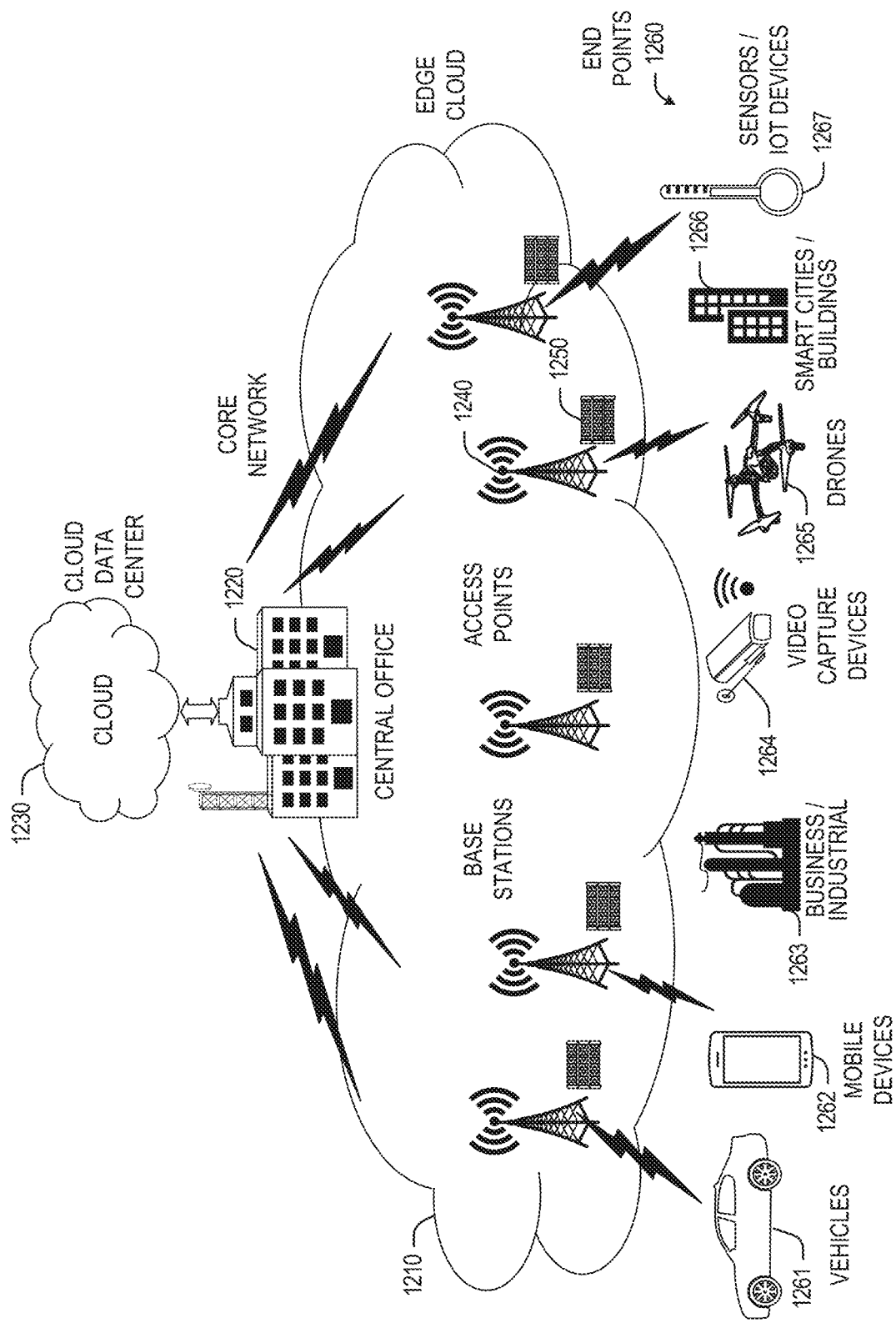
FIG. 12 illustrates an overview of an edge cloud configuration for edge computing.

The following paragraphs provide a general overview of edge computing, as discussed or deployed with the ICN techniques herein. FIG. 12 is a block diagram 1200 showing an overview of a configuration for edge computing, which includes a layer of processing referred to in many of the following examples as an "edge cloud". As shown, the edge cloud 1210 is co-located at an edge location, such as an access point or base station 1240, a local processing hub 1250, or a central office 1220, and thus may include multiple entities, devices, and equipment instances. The edge cloud 1210 is located much closer to the endpoint (consumer and producer) data sources 1260 (e.g., autonomous vehicles 1261, user equipment 1262, business and industrial equipment 1263, video capture devices 1264, drones 1265, smart cities and building devices 1266, sensors and IoT devices 1267, etc.) than the cloud data center 1230. Compute, memory, and storage resources which are offered at the edges in the edge cloud 1210 are critical to providing ultra-low latency response times for services and functions used by the endpoint data sources 1260 as well as reduce network backhaul traffic from the edge cloud 1210 toward cloud data center 1230 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 13:
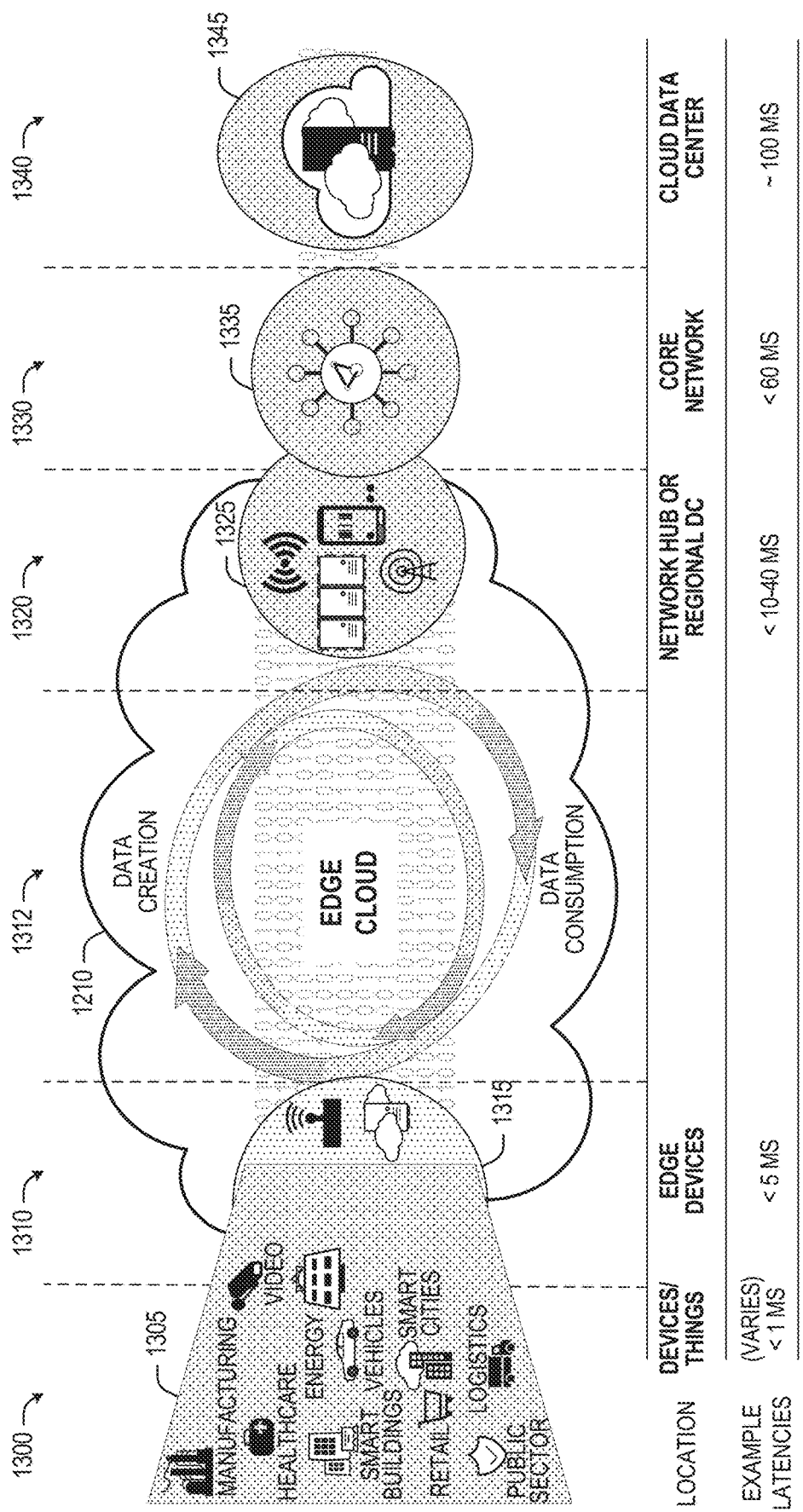
FIG. 13 illustrates operational layers among endpoints, an edge cloud, and cloud computing environments.

FIG. 13 illustrates operational layers among endpoints, an edge cloud, and cloud computing environments. Specifically, FIG. 13 depicts examples of computational use cases 1305, utilizing the edge cloud 1210 among multiple illustrative layers of network computing. The layers begin at an endpoint (devices and things) layer 1300, which accesses the edge cloud 1210 to conduct data creation, analysis, and data consumption activities. The edge cloud 1210 may span multiple network layers, such as an edge devices layer 1310 having gateways, on-premise servers, or network equipment (nodes 1315) located in physically proximate edge systems; a network access layer 1320, encompassing base stations, radio processing units, network hubs, regional data centers (DC), or local network equipment (equipment 1325); and any equipment, devices, or nodes located therebetween (in layer 1312, not illustrated in detail). The network communications within the edge cloud 1210 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1300, under 5 ms at the edge devices layer 1310, to even between 10 to 40 ms when communicating with nodes at the network access layer 1320. Beyond the edge cloud 1210 are core network 1330 and cloud data center 1340 layers, each with increasing latency (e.g., between 50-60 ms at the core network layer 1330, to 100 or more ms at the cloud data center layer). As a result, operations at a core network data center 1335 or a cloud data center 1345, with latencies of at least 50 to 100 ms or more, will not be able to accomplish many time-critical functions of the use cases 1305. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1335 or a cloud data center 1345, a central office or content data network may be considered as being located within a "near edge" layer ("near" to the cloud, having high latency values when communicating with the devices and endpoints of the use cases 1305), whereas an access point, base station, on-premise server, or network gateway may be considered as located within a "far edge" layer ("far" from the cloud, having low latency values when communicating with the devices and endpoints of the use cases 1305). It will be understood that other categorizations of a particular network layer as constituting a "close", "local". "near", "middle", or "far" edge may be based on latency, distance, number of network hops, or other measurable characteristics, as measured from a source in any of the network layers 1300-1340.

The various use cases 1305 may access resources under usage pressure from incoming streams, due to multiple services utilizing the edge cloud. To achieve results with low latency, the services executed within the edge cloud 1210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application): and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1210 may provide the ability to serve and respond to multiple applications of the use cases 1305 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS). Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1210 (network layers 1300-1340), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1210.

As such, the edge cloud 1210 is formed from network components and functional features operated by and within edge gateway nodes, edge aggregation nodes, or other edge compute nodes among network layers 1310-1330. The edge cloud 1210 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1210 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1210 may be servers, multi-tenant servers, appliance computing devices, and/or any other type of computing devices. For example, the edge cloud 1210 may be an appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The edge cloud 1210 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 14:
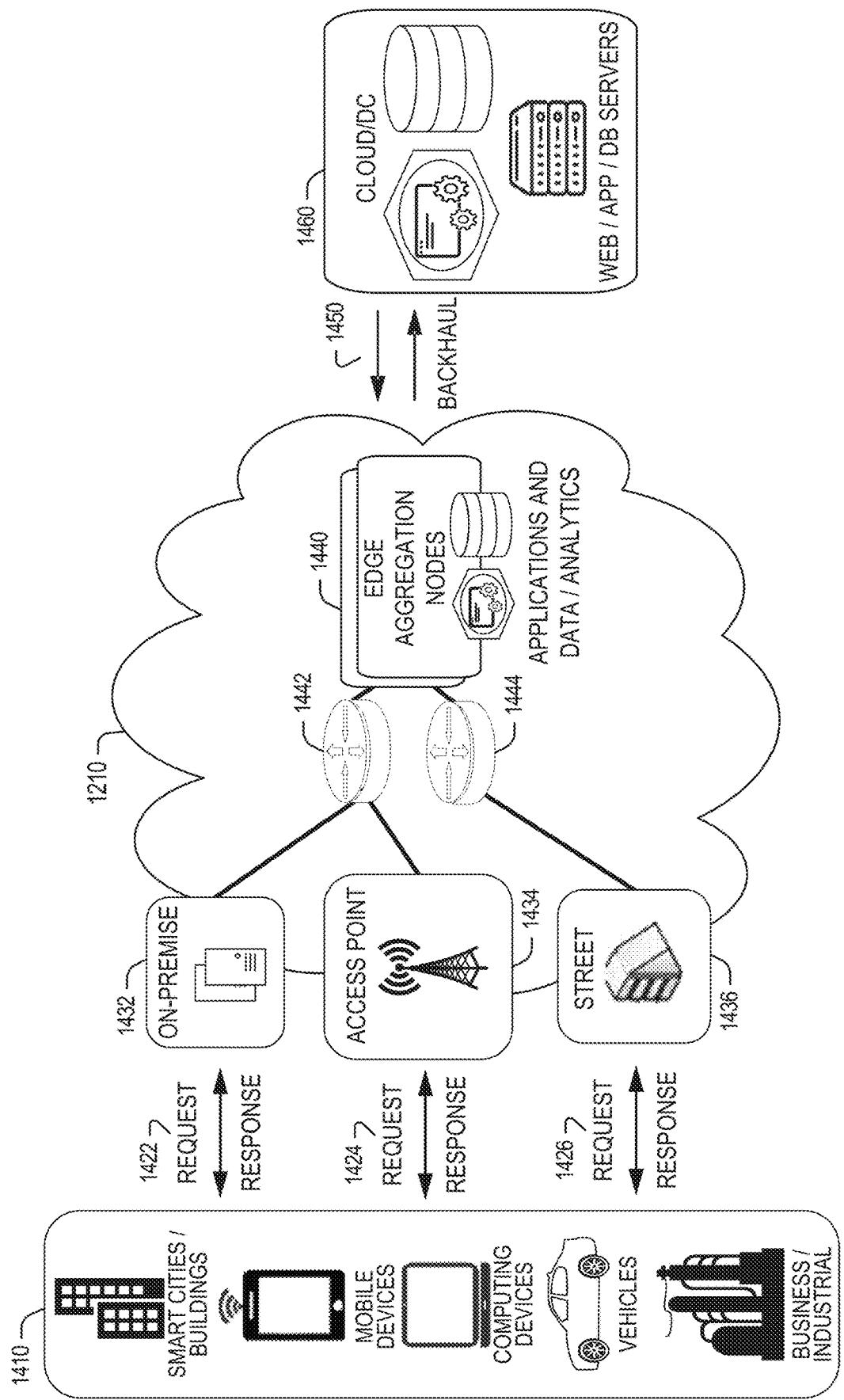
FIG. 14 illustrates an example approach for networking and services in an edge computing system.

In FIG. 14, various client endpoints 1410 (in the form of mobile devices, computers, autonomous vehicles, business computing equipment, industrial processing equipment) exchange requests and responses that are specific to the type of endpoint network aggregation. For instance, client endpoints 1410 may obtain network access via a wired broadband network, by exchanging requests and responses 1422 through an on-premise network system 1432. Some client endpoints 1410, such as mobile computing devices, may obtain network access via a wireless broadband network, by exchanging requests and responses 1424 through an access point (e.g., cellular network tower) 1434. Some client endpoints 1410, such as autonomous vehicles may obtain network access for requests and responses 1426 via a wireless vehicular network through a street-located network system 1436. However, regardless of the type of network access, the TSP may deploy aggregation points 1442, 1444 within the edge cloud 1210 to aggregate traffic and requests. Thus, within the edge cloud 1210, the TSP may deploy various compute and storage resources, such as at edge aggregation nodes 1440, to provide requested content. The edge aggregation nodes 1440 and other systems of the edge cloud 1210 are connected to a cloud or data center 1460, which uses a backhaul network 1450 to fulfill higher-latency requests from a cloud/data center for websites, applications, database servers, etc. Additional or consolidated instances of the edge aggregation nodes 1440 and the aggregation points 1442, 1444, including those deployed on a single server framework, may also be present within the edge cloud 1210 or other areas of the TSP infrastructure.

ADDITIONAL NOTES & EXAMPLES

Example 1 is a device for dynamic computation in an information centric network (ICN), the device included in an ICN node and comprising: a memory including instructions; and processing circuitry that, when configured by the instructions, causes the ICN node to: receive, at a first interface of the ICN node, an interest packet to perform a computation; perform a lookup in a forwarding information base (FIB) to identify a second interface to forward the interest packet; forward the interest packet on the second interface including creating an entry in a pending interest table (PIT) for the interest packet; receive a data packet on the second interface in response to the interest packet, the data packet including a processing payload, the processing payload including a status of a process running in response to the interest packet; update an entry for the second interface in the FIB with the processing payload; and transmit the data packet on the first interface in accordance with the PIT including removing the entry in the PIT.

In Example 2, the subject matter of Example 1, wherein the processing payload includes a parameter to include in a future interest packet to obtain a result of the process.

In Example 3, the subject matter of Example 2, wherein the parameter is a name prefix.

In Example 4, the subject matter of any of Examples 2-3, wherein the parameter is included in the entry for the second interface in the FIB.

In Example 5, the subject matter of Example 4, wherein the instructions further configure the processing circuitry to cause the ICN node to: receive a second interest packet that includes the parameter; perform a second lookup of the FIB using the parameter to locate the second interface; and forward the second interest packet on the second interface in response to the second lookup, the second interest packet forwarded to a compute node that performed the process.

In Example 6, the subject matter of Example 5, wherein the process is complete when the second interest packet is received by the compute node, and wherein a data packet is received on the second interface in response to the second interest packet, the data packet having a content type indicating that the data packet includes a result from the process in response to the second interest packet.

In Example 7, the subject matter of any of Examples 5-6, wherein the process has failed when the second interest packet is received by the compute node, and wherein a data packet is received on the second interface in response to the second interest packet, the data packet having a content type indicating that the data packet includes a process response, the process response indicating that the process failed.

In Example 8, the subject matter of any of Examples 5-7, wherein the process is ongoing when the second interest packet is received by the compute node, and wherein a data packet is received on the second interface in response to the second interest packet, the data packet having a content type indicating that the data packet includes a process response, the process response indicating that the process is still running.

In Example 9, the subject matter of any of Examples 1-8, wherein the processing payload indicates static capabilities of a compute node that provided the data packet.

In Example 10, the subject matter of any of Examples 1-9, wherein the processing payload indicates dynamic capabilities of a compute node that provided the data packet, the dynamic capabilities including an indication that the compute node is performing the process.

Example 11 is a method for dynamic computation in an information centric network (ICN), the method comprising: receiving, at a first interface of an ICN node, an interest packet to perform a computation; performing a lookup in a forwarding information base (FIB) to identify a second interface to forward the interest packet; forwarding the interest packet on the second interface including creating an entry in a pending interest table (PIT) for the interest packet; receiving a data packet on the second interface in response to the interest packet, the data packet including a processing payload, the processing payload including a status of a process running in response to the interest packet; updating an entry for the second interface in the FIB with the processing payload: and transmitting the data packet on the first interface in accordance with the PIT including removing the entry in the PIT.

In Example 12, the subject matter of Example 11, wherein the processing payload includes a parameter to include in a future interest packet to obtain a result of the process.

In Example 13, the subject matter of Example 12, wherein the parameter is a name prefix.

In Example 14, the subject matter of any of Examples 12-13, wherein the parameter is included in the entry for the second interface in the FIB.

In Example 15, the subject matter of Example 14, comprising: receiving a second interest packet that includes the parameter; performing a second lookup of the FIB using the parameter to locate the second interface; and forwarding the second interest packet on the second interface in response to the second lookup, the second interest packet forwarded to a compute node that performed the process.

In Example 16, the subject matter of Example 15, wherein the process is complete when the second interest packet is received by the compute node, and wherein a data packet is received on the second interface in response to the second interest packet, the data packet having a content type indicating that the data packet includes a result from the process in response to the second interest packet.

In Example 17, the subject matter of any of Examples 15-16, wherein the process has failed when the second interest packet is received by the compute node, and wherein a data packet is received on the second interface in response to the second interest packet, the data packet having a content type indicating that the data packet includes a process response, the process response indicating that the process failed.

In Example 18, the subject matter of any of Examples 15-17, wherein the process is ongoing when the second interest packet is received by the compute node, and wherein a data packet is received on the second interface in response to the second interest packet, the data packet having a content type indicating that the data packet includes a process response, the process response indicating that the process is still running.

In Example 19, the subject matter of any of Examples 11-18, wherein the processing payload indicates static capabilities of a compute node that provided the data packet.

In Example 20, the subject matter of any of Examples 11-19, wherein the processing payload indicates dynamic capabilities of a compute node that provided the data packet, the dynamic capabilities including an indication that the compute node is performing the process.

Example 21 is at least one machine-readable medium including instructions for dynamic computation in an information centric network (ICN), the instructions, when executed by processing circuitry, cause an ICN node to perform operations comprising: receiving, at a first interface of the ICN node, an interest packet to perform a computation; performing a lookup in a forwarding information base (FIB) to identify a second interface to forward the interest packet; forwarding the interest packet on the second interface including creating an entry in a pending interest table (PIT) for the interest packet; receiving a data packet on the second interface in response to the interest packet, the data packet including a processing payload, the processing payload including a status of a process running in response to the interest packet; updating an entry for the second interface in the FIB with the processing payload; and transmitting the data packet on the first interface in accordance with the PIT including removing the entry in the PIT.

In Example 22, the subject matter of Example 21, wherein the processing payload includes a parameter to include in a future interest packet to obtain a result of the process.

In Example 23, the subject matter of Example 22, wherein the parameter is a name prefix.

In Example 24, the subject matter of any of Examples 22-23, wherein the parameter is included in the entry for the second interface in the FIB.

In Example 25, the subject matter of Example 24, wherein the operations comprise: receiving a second interest packet that includes the parameter; performing a second lookup of the FIB using the parameter to locate the second interface; and forwarding the second interest packet on the second interface in response to the second lookup, the second interest packet forwarded to a compute node that performed the process.

In Example 26, the subject matter of Example 25, wherein the process is complete when the second interest packet is received by the compute node, and wherein a data packet is received on the second interface in response to the second interest packet, the data packet having a content type indicating that the data packet includes a result from the process in response to the second interest packet.

In Example 27, the subject matter of any of Examples 25-26, wherein the process has failed when the second interest packet is received by the compute node, and wherein a data packet is received on the second interface in response to the second interest packet, the data packet having a content type indicating that the data packet includes a process response, the process response indicating that the process failed.

In Example 28, the subject matter of any of Examples 25-27, wherein the process is ongoing when the second interest packet is received by the compute node, and wherein a data packet is received on the second interface in response to the second interest packet, the data packet having a content type indicating that the data packet includes a process response, the process response indicating that the process is still running.

In Example 29, the subject matter of any of Examples 21-28, wherein the processing payload indicates static capabilities of a compute node that provided the data packet.

In Example 30, the subject matter of any of Examples 21-29, wherein the processing payload indicates dynamic capabilities of a compute node that provided the data packet, the dynamic capabilities including an indication that the compute node is performing the process.

Example 31 is a system for dynamic computation in an information centric network (ICN), the system comprising:

means for receiving, at a first interface of an ICN node, an interest packet to perform a computation; means for performing a lookup in a forwarding information base (FIB) to identify a second interface to forward the interest packet; means for forwarding the interest packet on the second interface including creating an entry in a pending interest table (PIT) for the interest packet; means for receiving a data packet on the second interface in response to the interest packet, the data packet including a processing payload, the processing payload including a status of a process running in response to the interest packet; means for updating an entry for the second interface in the FIB with the processing payload; and means for transmitting the data packet on the first interface in accordance with the PIT including removing the entry in the PIT.

In Example 32, the subject matter of Example 31, wherein the processing payload includes a parameter to include in a future interest packet to obtain a result of the process.

In Example 33, the subject matter of Example 32, wherein the parameter is a name prefix.

In Example 34, the subject matter of any of Examples 32-33, wherein the parameter is included in the entry for the second interface in the FIB.

In Example 35, the subject matter of Example 34, comprising: means for receiving a second interest packet that includes the parameter; means for performing a second lookup of the FIB using the parameter to locate the second interface; and means for forwarding the second interest packet on the second interface in response to the second lookup, the second interest packet forwarded to a compute node that performed the process.

In Example 36, the subject matter of Example 35, wherein the process is complete when the second interest packet is received by the compute node, and wherein a data packet is received on the second interface in response to the second interest packet, the data packet having a content type indicating that the data packet includes a result from the process in response to the second interest packet.

In Example 37, the subject matter of any of Examples 35-36, wherein the process has failed when the second interest packet is received by the compute node, and wherein a data packet is received on the second interface in response to the second interest packet, the data packet having a content type indicating that the data packet includes a process response, the process response indicating that the process failed.

In Example 38, the subject matter of any of Examples 35-37, wherein the process is ongoing when the second interest packet is received by the compute node, and wherein a data packet is received on the second interface in response to the second interest packet, the data packet having a content type indicating that the data packet includes a process response, the process response indicating that the process is still running.

In Example 39, the subject matter of any of Examples 31-38, wherein the processing payload indicates static capabilities of a compute node that provided the data packet.

In Example 40, the subject matter of any of Examples 31-39, wherein the processing payload indicates dynamic capabilities of a compute node that provided the data packet, the dynamic capabilities including an indication that the compute node is performing the process.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

Another example implementation is an edge computing system, including respective edge processing devices and nodes to invoke or perform the operations of Examples 1-40, or other subject matter described herein.

Another example implementation is a client endpoint node, operable to invoke or perform the operations of Examples 1-40, or other subject matter described herein.

Another example implementation is an aggregation node, network hub node, gateway node, or core data processing node, within or coupled to an edge computing system, operable to invoke or perform the operations of Examples 1-40, or other subject matter described herein.

Another example implementation is an access point, base station, road-side unit, street-side unit, or on-premise unit, within or coupled to an edge computing system, operable to invoke or perform the operations of Examples 1-40, or other subject matter described herein.

Another example implementation is an edge provisioning node, service orchestration node, application orchestration node, or multi-tenant management node, within or coupled to an edge computing system, operable to invoke or perform the operations of Examples 1-40, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-40, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-40, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to European Telecommunications Standards Institute (ETSI) Multi-Access Edge Computing (MEC) specifications, operable to invoke or perform the use cases discussed herein, with use of Examples 1-40, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 1-40, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-40, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-40, or other subject matter described herein.

Another example implementation is an edge computing system configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples 1-40, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-40, or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-40, or other subject matter described herein.

Another example implementation is an apparatus of an edge computing system comprising means, logic, modules, or circuitry to invoke or perform the use cases discussed herein, with use of Examples 1-40, or other subject matter described herein.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for dynamic computation in an information centric network (ICN), the device included in an ICN node and comprising:
   a memory including instructions; and
   processing circuitry that, when configured by the instructions, causes the ICN node to:
      receive, at a first interface of the ICN node, an interest packet to perform a computation;
      perform a lookup in a forwarding information base (FIB) to identify a second interface to forward the interest packet;
      forward the interest packet on the second interface including creating an entry in a pending interest table (PIT) for the interest packet;
      receive a data packet on the second interface in response to the interest packet, the data packet including a processing payload, the processing payload including:
         a status of a process running in response to the interest packet; and
         a parameter to include in a future interest packet to obtain a result of the process;
      update an entry for the second interface in the FIB with the processing payload;
      transmit the data packet on the first interface in accordance with the PIT including removing the entry in the PIT;
      receive a second interest packet that includes the parameter;
      perform a second lookup of the FIB using the parameter to locate the second interface;
      forward the second interest packet on the second interface in response to the second lookup, the second interest packet forwarded to a compute node that performed the process;

receive a second data packet in response to the second interest packet on the second interface, the second data packet including a content type indicating a payload based on a state of the process.

2. The device of claim 1, wherein the parameter is a name prefix.

3. The device of claim 1, wherein the parameter is included in the entry for the second interface in the FIB.

4. The device of claim 1, wherein the state of the process is complete when the second interest packet is received by the compute node, and wherein the content type of the second data packet indicates that the data packet includes a result from the process.

5. The device of claim 1, wherein the state of the process is failed when the second interest packet is received by the compute node, and wherein the content type of the second data packet indicates that the data packet includes a process response, the process response indicating that the process failed.

6. The device of claim 1, wherein the state of the process is ongoing when the second interest packet is received by the compute node, and wherein the content type of the second data packet indicates that the data packet includes a process response, the process response indicating that the process is still running.

7. The device of claim 1, wherein the processing payload indicates static capabilities of a compute node that provided the data packet.

8. The device of claim 1, wherein the processing payload indicates dynamic capabilities of a compute node that provided the data packet, the dynamic capabilities including an indication that the compute node is performing the process.

9. A method for dynamic computation in an information centric network (ICN), the method comprising:
receiving, at a first interface of an ICN node, an interest packet to perform a computation;
performing a lookup in a forwarding information base (FIB) to identify a second interface to forward the interest packet;
forwarding the interest packet on the second interface including creating an entry in a pending interest table (PIT) for the interest packet;
receiving a data packet on the second interface in response to the interest packet, the data packet including a processing payload, the processing payload including:
a status of a process running in response to the interest packet; and
a parameter to include in a future interest packet to obtain a result of the process;
updating an entry for the second interface in the FIB with the processing payload;
transmitting the data packet on the first interface in accordance with the PIT including removing the entry in the PIT;
receiving a second interest packet that includes the parameter;
performing a second lookup of the FIB using the parameter to locate the second interface;
forwarding the second interest packet on the second interface in response to the second lookup, the second interest packet forwarded to a compute node that performed the process;
receiving a second data packet in response to the second interest packet on the second interface, the second data packet including a content type indicating a payload based on a state of the process.

10. The method of claim 9, wherein the parameter is included in the entry for the second interface in the FIB.

11. At least one non-transitory machine-readable medium including instructions for dynamic computation in an information centric network (ICN), the instructions, when executed by processing circuitry, cause an ICN node to perform operations comprising:
receiving, at a first interface of an ICN node, an interest packet to perform a computation;
performing a lookup in a forwarding information base (FIB) to identify a second interface to forward the interest packet;
forwarding the interest packet on the second interface including creating an entry in a pending interest table (PIT) for the interest packet;
receiving a data packet on the second interface in response to the interest packet, the data packet including a processing payload, the processing payload including:
a status of a process running in response to the interest packet; and
a parameter to include in a future interest packet to obtain a result of the process;
updating an entry for the second interface in the FIB with the processing payload;
transmitting the data packet on the first interface in accordance with the PIT including removing the entry in the PIT;
receiving a second interest packet that includes the parameter;
performing a second lookup of the FIB using the parameter to locate the second interface;
forwarding the second interest packet on the second interface in response to the second lookup, the second interest packet forwarded to a compute node that performed the process;
receiving a second data packet in response to the second interest packet on the second interface, the second data packet including a content type indicating a payload based on a state of the process.

12. The at least one machine-readable medium of claim 11, wherein the parameter is a name prefix.

13. The at least one machine-readable medium of claim 11, wherein the parameter is included in the entry for the second interface in the FIB.

14. The at least one machine-readable medium of claim 11, wherein the state of the process is complete when the second interest packet is received by the compute node, and wherein the content type of the second data packet indicates that the data packet includes a result from the process.

15. The at least one machine-readable medium of claim 11, wherein the state of the process is failed when the second interest packet is received by the compute node, and wherein the content type of the second data packet indicates that the data packet includes a process response, the process response indicating that the process failed.

16. The at least one machine-readable medium of claim 11, wherein the state of the process is ongoing when the second interest packet is received by the compute node, and wherein the content type of the second data packet indicates that the data packet includes a process response, the process response indicating that the process is still running.

17. The at least one machine-readable medium of claim 11, wherein the processing payload indicates static capabilities of a compute node that provided the data packet.

18. The at least one machine-readable medium of claim 11, wherein the processing payload indicates dynamic capabilities of a compute node that provided the data packet, the dynamic capabilities including an indication that the compute node is performing the process.

\* \* \* \* \*